United States Patent
Badr

(10) Patent No.: US 12,488,224 B2
(45) Date of Patent: Dec. 2, 2025

(54) GENERATIVE MODEL SOFT PROMPT TUNING FOR CONTENT ITEM GENERATION

(71) Applicant: Google LLC, Mountain View, CA (US)

(72) Inventor: Ibrahim Badr, New York, NY (US)

(73) Assignee: GOOGLE LLC, Mountain View, CA (US)

( * ) Notice: Subject to any disclaimer, the term of this patent is extended or adjusted under 35 U.S.C. 154(b) by 88 days.

(21) Appl. No.: 18/484,733

(22) Filed: Oct. 11, 2023

(65) Prior Publication Data

US 2025/0124262 A1    Apr. 17, 2025

(51) Int. Cl.
*G06N 3/0475* (2023.01)
*G06N 3/08* (2023.01)

(52) U.S. Cl.
CPC ............ *G06N 3/0475* (2023.01); *G06N 3/08* (2013.01)

(58) Field of Classification Search
None
See application file for complete search history.

(56) References Cited

U.S. PATENT DOCUMENTS 11,748,555 B2 *   9/2023   Tran ..................... G06N 3/047
                                                         715/202
2023/0342559 A1 *  10/2023  Bhardwaj .............. G06N 20/00

OTHER PUBLICATIONS

"From Hemingway-inspired fan fiction to pun-filled poems, a new language-generating AI does it all," Robertson (Year: 2020).*
"Language Modeling As A Multi-task Problem," Weber et al; Weber, arXiv (Year: 2021).*
"Training language models to follow instructions with human feedback," Ouyang et al; Ouyang (Year: 2022).*
"From Hemingway-inspired fan fiction to pun-filled poems, a new language-generating AI does it all," Robertson, Literary Hub (Year: 2020).*
"From Hemingway-inspired fan fiction to pun-filled poems, a new language-generating AI does it all," Robertson, Literary Hub, 2020. (Year: 2020).*
The Illustrated BERT, ELMo, and co. (How NLP Cracked Transfer Learning), Alammar, 2018. (Year: 2018).*
"Prefix-Tuning: Optimizing Continuous Prompts for Generation", arXiv, 2021, Li et al; Li (Year: 2021).*
"Plug and Play Language Models: A Simple Approach to Controlled Text Generation," arXiv, 2020, Dathathri et al; Dathathri (Year: 2020).*
Lester et al. "The Power of Scale for Parameter-Efficient Prompt Tuning", arXiv:2104.08691v2, Sep. 2, 2021, 15 pages.

* cited by examiner

*Primary Examiner* — Michael J Huntley
*Assistant Examiner* — Paul J Breene
(74) *Attorney, Agent, or Firm* — DORITY & MANNING P.A.

(57) ABSTRACT

Systems and methods for user-specific content generation can leverage parameter tuning based on user feedback data to tune a set of parameters for conditioning a machine-learned content generation model for the content generation. The set of parameters can be processed with the machine-learned content generation model to generate a model-generated content item that is associated with user tastes and interests. The parameter tuning can include processing user interactions associated with the model-generated content item to adjust the set of parameters.

17 Claims, 10 Drawing Sheets

GENERATIVE MODEL SOFT PROMPT TUNING FOR CONTENT ITEM GENERATION

FIELD

The present disclosure relates generally to parameter tuning for content generation. More particularly, the present disclosure relates to soft prompt parameter tuning for user-specific content item generation with a generative model.

BACKGROUND

Providing entertaining content to users can be difficult based on users having different tastes and interests. Different users may be interested in different topics and content types. For example, one user may enjoy Shakespearean sonnets about romance, while another user may view a Shakespearean sonnet as outdated and unrelatable. Alternatively and/or additionally, one user may enjoy a particular form of humor, while another user has a starkly different sense of humor. Moreover, proactively identifying and surfacing content items associated with particular user preferences may pose issues of redundancy and/or lack of user-specific tailoring.

Additionally, training a machine-learned model on user-specific interests and tastes can be computationally expensive based on the number of parameters being trained and the processing of user historical data to determine tastes and interest. The training may inhibit the usage of the model for other downstream tasks and may lead to additional models being trained adding further to the computational inefficiency of training.

SUMMARY

Aspects and advantages of embodiments of the present disclosure will be set forth in part in the following description, or can be learned from the description, or can be learned through practice of the embodiments.

One example aspect of the present disclosure is directed to a computing system for soft prompt tuning for proactive content generation. The system can include one or more processors and one or more non-transitory computer-readable media that collectively store instructions that, when executed by the one or more processors, cause the computing system to perform operations. The operations can include obtaining input data. The input data can be descriptive of a particular user accessing a user interface. The operations can include obtaining a soft prompt associated with the particular user and processing the soft prompt with a machine-learned content generation model to generate a model-generated content item. The soft prompt can include a set of parameters. The model-generated content item can be generated based on the set of parameters associated with the particular user. The operations can include providing the model-generated content item to the particular user via the user interface. The operations can include generating feedback data based on data retrieved from a user computing system via the user interface. In some implementations, the feedback data can be associated with one or more interactions with the model-generated content item. The operations can include adjusting a subset of the set of parameters of the soft prompt associated with the particular user based on the feedback data.

In some implementations, the operations can include obtaining search history data associated with the particular user. The search history data can be descriptive of a plurality of previous search queries associated with the particular user. The model-generated content item can be generated based on the search history data. The operations further can include determining the search history data is associated with a particular topic. Data descriptive of the particular topic and the set of parameters can be processed with the machine-learned content generation model to generate the model-generated content item.

In some implementations, the operations can include obtaining browsing history data associated with the particular user. The browsing history data can be descriptive of a plurality of web resources viewed previously by the particular user. The model-generated content item can be generated based on the browsing history data. The operations can include determining the browsing history data is associated with a particular topic. Data descriptive of the particular topic and the set of parameters can be processed with the machine-learned content generation model to generate the model-generated content item. The operations can include determining the browsing history data is associated with a particular content type. Data descriptive of the particular content type and the set of parameters can be processed with the machine-learned content generation model to generate the model-generated content item. The model-generated content item can be the particular content type.

In some implementations, the operations can include providing a feedback interface in the user interface with the model-generated content item. The feedback interface can include a user interface element for receiving feedback from the particular user. The operations can include obtaining a feedback input from a user computing system via the feedback interface. The feedback input can be descriptive of a user satisfaction metric. The feedback data can be generated based on the feedback input.

In some implementations, the operations can include determining a viewing time associated with the model-generated content item being displayed via the user interface. The feedback data can be generated based on the viewing time. The machine-learned content generation model can be a pre-trained generative model. A plurality of parameters of the machine-learned content generation model can be fixed during adjusting of the subset of the set of parameters. In some implementations, the operations can include storing the soft prompt including the set of parameters in a user profile database.

Another example aspect of the present disclosure is directed to a computer-implemented method for proactive content generation. The method can include obtaining, by a computing system including one or more processors, input data. The input data can be descriptive of a particular user accessing a user interface. The method can include obtaining, by the computing system, a set of parameters associated with the particular user. The set of parameters may have been trained based on interaction data associated with the particular user. In some implementations, the interaction data can be descriptive of previous interactions by the particular user with previously generated content items. The method can include processing, by the computing system, the set of parameters with a machine-learned content generation model to generate a model-generated content item. The model-generated content item can be generated based on the set of parameters associated with the particular user. The method can include providing, by the computing system, the model-generated content item to the particular user via the user interface.

In some implementations, the method can include obtaining, by the computing system, a prompt input. The prompt input can be descriptive of a request for a particular content type. The prompt input and the set of parameters can be processed with the machine-learned content generation model to generate the model-generated content item of the particular content type. The particular content type can include a poem. The particular content type can include a joke.

In some implementations, the method can include obtaining, by the computing system, a prompt input. The prompt input can be descriptive of a request for a content item associated with a particular topic. The prompt input and the set of parameters can be processed with the machine-learned content generation model to generate the model-generated content item associated with the particular topic. The particular topic can be associated with a plot of a story.

Another example aspect of the present disclosure is directed to one or more non-transitory computer-readable media that collectively store instructions that, when executed by one or more computing devices, cause the one or more computing devices to perform operations. The operations can include obtaining input data. The input data can be descriptive of a particular user accessing a user interface. The operations can include obtaining a soft prompt associated with the particular user. The soft prompt can include a set of parameters. The operations can include processing the set of parameters of the soft prompt with a machine-learned content generation model to generate a model-generated content item. In some implementations, the model-generated content item can be generated based on the set of parameters associated with the particular user. The operations can include providing the model-generated content item to the particular user via the user interface. The operations can include generating feedback data based on data retrieved from a user computing system via the user interface. The feedback data can be associated with one or more interactions with the model-generated content item. The operations can include adjusting a subset of the set of parameters of the soft prompt associated with the particular user based on the feedback data.

In some implementations, the machine-learned content generation model can include a generative model trained to generate literary fiction. The machine-learned content generation model can include a language model trained on a plurality of different downstream tasks. The operations can include obtaining preference data descriptive of a plurality of preferences associated with the particular user and processing the preference data to generate a user-specific prompt. The user-specific prompt and the set of parameters can be processed with the machine-learned content generation model to generate the model-generated content item.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

Figure 1:
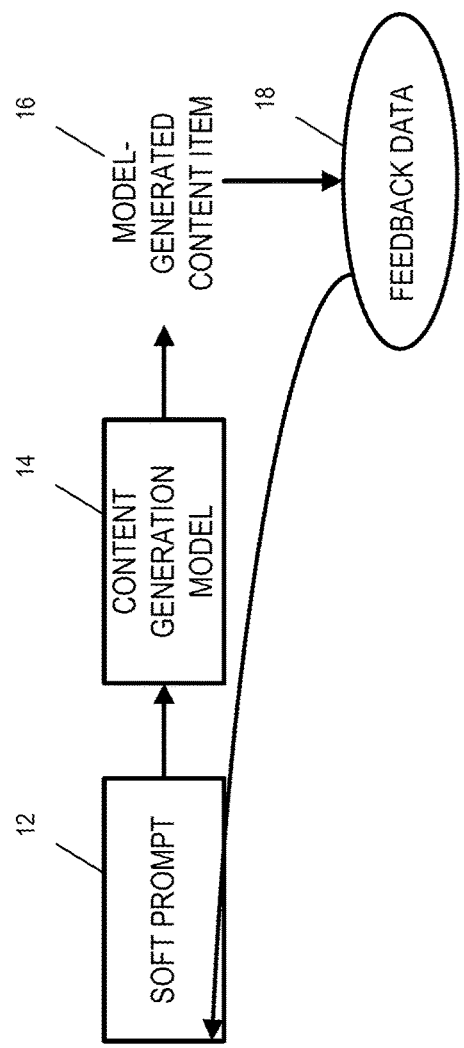
FIG. 1 depicts a block diagram of an example parameter tuning system according to example embodiments of the present disclosure.

Reference numerals that are repeated across plural figures are intended to identify the same features in various implementations.

DETAILED DESCRIPTION

Generally, the present disclosure is directed to systems and methods for parameter tuning for content item generation. In particular, the systems and methods disclosed herein can leverage user feedback to fine tune a set of parameters for a particular user and/or a set of users to then be utilized for providing a user-specific content generation system. For example, a set of parameters can be processed with a machine-learned content generation model to generate a model-generated content item, which may include a poem, a piece of prose, a joke, a riddle, and/or other content items. Based on the user's interactions with the model-generated content item, feedback data can be generated. The feedback data can then be utilized to adjust a subset of the set of parameters. The feedback tuning loop can be repeated iteratively to tune the system for user-specific content generation.

A tuned system can be leveraged for proactive content generation, which may be performed in response to a user accessing (opening or launching) a particular user interface. The content generation can be tuned to be aware of content types, topics, styles, terminology, settings, and/or plots that the user enjoys. The learned tastes and interests can be leveraged to generate new content items that include the user tastes and interests. Additionally and/or alternatively, the systems and methods may obtain and/or generate a prompt input to be processed with the machine-learned content generation model along with the set of parameters. The prompt input can include a manual input, a deterministic input (for the particular user, a set of users, and/or a global input), and/or system generated input (e.g., user search history, user browsing history, local or global trends, and/or other data can be processed to generate a prompt input to generate a contextually aware input). The prompt input can be processed to generate a model-generated content item that includes topics, styles, a content type, a setting, and/or characters associated with a user and/or global context.

Proactive content generation can be difficult based on users having different tastes and interests. One content item may be entertaining to one user and boring to another user. Additionally and/or alternatively, one user may understand and relate to a certain genre, plot and/or topic, while another user may not. Tastes and interests can affect whether a user finds a content item enjoyable and entertaining.

Parameter tuning based on feedback data associated with user interactions with a model-generated content item can leverage user provided feedback to tailor a content generation system to be user-specific. A user interface may be leveraged to obtain direct feedback associated with a user without the computational data cost of obtaining and processing historical data associated with the user to tune the parameters. The direct feedback data may reduce the training data size for tuning a set of parameters for user-specific content generation. The parameter tuning can be performed to learn user preferences associated with content types, styles, topics, genres, aesthetics, plots, and/or other attributes. The learned preferences can then be utilized with a generative model to generate new content items specifically tailored for the users tastes and interests.

Additionally and/or alternatively, training a machine-learned model on user-specific interests and tastes can be computationally expensive based on the number of parameters being trained. Large language models and other large generative models may include billions or even trillions of parameters. Retraining the pre-trained generative model for a specific downstream task can be computationally expensive based on the number of parameters and the quantity of training data that may be utilized.

The utilization of a soft prompt (i.e., a set of parameters that can be processed with a generative model for downstream task conditioning) can reduce the computational cost for parameter tuning for user-specific content generation by reducing the parameters to be tuned. The set of parameters can be limited and may be adjusted while the parameters of the pre-trained generative model stay fixed. The set of parameters of the soft prompt can be utilized to condition the pre-trained generative model (e.g., the machine-learned content generation model) for particular downstream tasks (e.g., content generation that is associated with user tastes and interests).

Generative models can be utilized for a wide variety of tasks. In particular, the training of large language models on poems and other entertainment content items can enable large language models to be utilized for content generation for entertainment purposes. User-specific prompt tuning can configure the content generation for user specific preferences, such that the prediction and generation abilities of a generative model can be leveraged for user-specific content generation. A user feedback loop can directly obtain data on user preferences without privacy concerns and/or the computational cost of determining user preferences based on previously viewed content, which can then be utilized for the parameter tuning.

Prompt tuning for content generation can be utilized to configure a content generation system for proactive content generation based on user provided feedback, which can be implemented in a search interface, in a discover feed interface, and/or in other interfaces. The content generation can be implemented in media gallery applications, social media applications, messaging applications, and/or other applications. The model-generated content items can be a variety of different types, which can include poems, stories, jokes, riddles, comics, videos, songs, podcasts, and/or other content items. The prompt tuning can leverage feedback tuning to adjust generation for user preferences associated with content types, style, tone, language, and/or length.

The systems and methods of the present disclosure provide a number of technical effects and benefits. As one example, the system and methods can be utilized to learn a plurality of soft prompts for a plurality of different users (or user groups). The different soft prompts can be paired with their respective task to allow for conditioning pre-trained machine-learned models for specific tasks by selecting a particular soft prompt associated with a particular topic, particular content type, a particular genre, a particular style, and/or particular user (or user group). Additionally and/or alternatively, the soft prompts can be paired with their respective task embeddings and stored in a prompt database. The learned soft prompt and the task embedding can then be utilized for initializing the training of new soft prompts for new users with similar tastes and/or interests. For example, the systems and methods can determine a particular soft prompt to utilize for initialization of new prompt tuning based on a determined similarity between users.

Another example technical effect and benefit relates to improved computational efficiency and improvements in the functioning of a computing system. For example, a technical benefit of the systems and methods of the present disclosure is the ability to reduce the computational resources needed for training and using a pre-trained machine-learned model system. In particular, prompt tuning can allow for the circumvention of retraining the full pre-trained machine-learned model. The systems and methods disclosed herein can allow for the focused training of only a subset of parameters for the specific task and/or specific user (or group of users). For example, instead of retraining the parameters of a model for each new user, the systems and methods disclosed herein can train a prompt for each user, in which each of the plurality of prompts can individually and/or in combination be input into the same pre-trained machine-learned model to generate an output specific for the user. Therefore, instead of having to train billions of parameters of a model for each new task, a system can train tens of thousands of parameters of a soft prompt which can then utilize the billions of pre-trained parameters of the pre-trained machine-learned model. The soft prompt transfer learning can further improve the conditioning and output while maintaining the computational efficiency advantages of the prompt tuning.

The systems and methods of the present disclosure provide a number of technical effects and benefits. As one example, the systems and methods can provide proactive content item generation. The systems and methods can leverage a set of tuned parameters (e.g., a soft prompt) for user-specific (taste-specific and/or interest-specific) content generation. In particular, a set of parameters can be tuned based on user interactions with model-generated content items to configure the generation for tailored generation upon future proactive generation instances.

Another technical benefit of the systems and methods of the present disclosure is the ability to leverage soft prompt tuning to address the computational cost of user specific tailoring of large generative models. In particular, the training and/or tuning of generative models can be computationally expensive and may degrade pre-existing learned weights. Therefore, user-specific generative models may not be practical at a large scale using existing techniques. The systems and methods disclosed herein can leverage user feedback to obtain direct feedback on user tastes and interests, which can then be utilized for soft prompt tuning to (1) avoid the computational cost of generative model tuning, and (2) avoid the computational cost of learning tastes and interests by processing user log and profile data to obtain indirect information for tuning and/or training. Additionally and/or alternatively, the user feedback loop for soft prompt tuning may leverage user feedback to dynamically tune the parameters based on progressions in user taste and interests.

Another technical benefit of the systems and methods of the present disclosure is the ability to leverage a generative language model to generate a natural language content item. The generative language model can be utilized to generate entertaining content items that emulate styles, content types, and/or terminology identified as being of interest to the user. In some implementations, the generative language model and/or one or more soft prompts (e.g., a set of machine-learned parameters that can be processed with the input by the generative language model) can be trained to emulate the tone, style, and/or vocabulary of a particular time period, particular genre, a particular user, and/or a set of users to provide content items in terms, tone, styles, and/or dialects that a user traditionally uses and/or views.

With reference now to the Figures, example embodiments of the present disclosure will be discussed in further detail.

FIG. 1 depicts a block diagram of an example parameter tuning system 10 according to example embodiments of the present disclosure. In some implementations, the parameter tuning system 10 is configured to receive, and/or obtain, a soft prompt 12 descriptive of a set of tunable parameters and, as a result of receipt of the soft prompt 12, generate, determine, and/or provide a model-generated content item 16 that is generated with a content generation model 14. Thus, in some implementations, the parameter tuning system 10 can include a content generation model 14 that is operable to generate new content items based on a plurality of learned parameters.

In particular, in response to a user accessing a content generation interface, a soft prompt 12 can be obtained from a database. The soft prompt 12 can include a set of parameters. The set of parameters of the soft prompt 12 can be generated and/or tuned to condition a generative model (e.g., a content generation model 14) to generate content items associated with learned tastes and/or interests of the user (and/or a set of users). The set of parameters can be tuned based on feedback data 18.

For example, the soft prompt 12 can be processed with a content generation model 14 to generate a model-generated content item 16. The model-generated content item 16 can be provided for display to the user. Feedback data 18 can then be generated based on user interactions associated with the model-generated content item 16. The feedback data 18 can then be utilized to adjust one or more parameters of the soft prompt 12.

The tuning loop can be performed iteratively to fine tune the soft prompt 12 to learn content types, topics, styles, terminology, and/or other preferences of the user (or set of users). The soft prompt 12 may be stored in a profile database and may be indexed with a user profile for the particular user. In some implementations, a soft prompt 12 may be utilized for a plurality of users determined to be associated with one another. The association can be determined based on determining the users share similar tastes and interests in content. The determination may be based on search histories, browsing histories, purchase histories, social media data, manually entered preferences, and/or other data.

The content generation model 14 can include one or more machine-learned models, one or more heuristic blocks, and/or one or more deterministic functions. The content generation model 14 can include a generative model. The generative model can be trained to learn sequences and/or relationships between data features. The content generation model 14 can be trained to continually predict words and or phrases that have the highest probability of being next based on learned language representations, inputs, and/or context tokens until a content item is generated. The content generation model 14 may be trained on a plurality of different tasks utilizing training data associated with a plurality of different content types, styles, genres, terminology, and/or other attributes. The content generation model 14 may include a language model, an image generation model, an audio generation, a multimodal generation model, and/or other models. The content generation model 14 can include an autoregressive model and/or a diffusion model.

The model-generated content item 16 can include model-generated fiction. The model-generated content item 16 can include a short poem, a short story, a play, a joke, a riddle, a comic, a painting, a video, a song, a podcast, a picture book, and/or other content items. The model-generated content item 16 can include prediction data associated with a plurality of predictions performed by the content generation model 14 that may be descriptive of words, phrases, pixels, signals, and/or other forms of data predicted to be associated with one another and/or associated with the set of parameters of the soft prompt 12 and/or a prompt input. The predictions can be performed based on learned sequences, relationships, and/or representations. The model-generated content items 16 can differ from the content items of the training dataset of the content generation model 14 and/or the set of parameters. The model-generated content item 16 can include features associated with a plurality of different pre-existing content items. In some implementations, the model-generated content item 16 can be a novel content item that differs from any known pre-existing content item.

The feedback data 18 can be descriptive of one or more user interactions associated with the model-generated content item 16. The feedback data 18 can be generated based on a viewing time, a save operation being performed, a download operation being performed, a copy operation being performed, a deletion operation being performed, a satisfaction level selection, a like option selection, and/or other interactions. In some implementations, a feedback interface can be provided with the model-generated content item 16 to receive inputs from the user that can be utilized to generate the feedback data 18. The feedback interface can include a satisfaction rating option, a satisfied option, a dissatisfied option, a text input box for an explanation, and/or augmentation options.

The feedback data 18 may be utilized to adjust one or more parameters of the soft prompt 12, which may include processing the feedback data 18 with a loss function to generate a gradient descent that can be backpropagated to the soft prompt 12 to perform the tuning.

Figure 2:
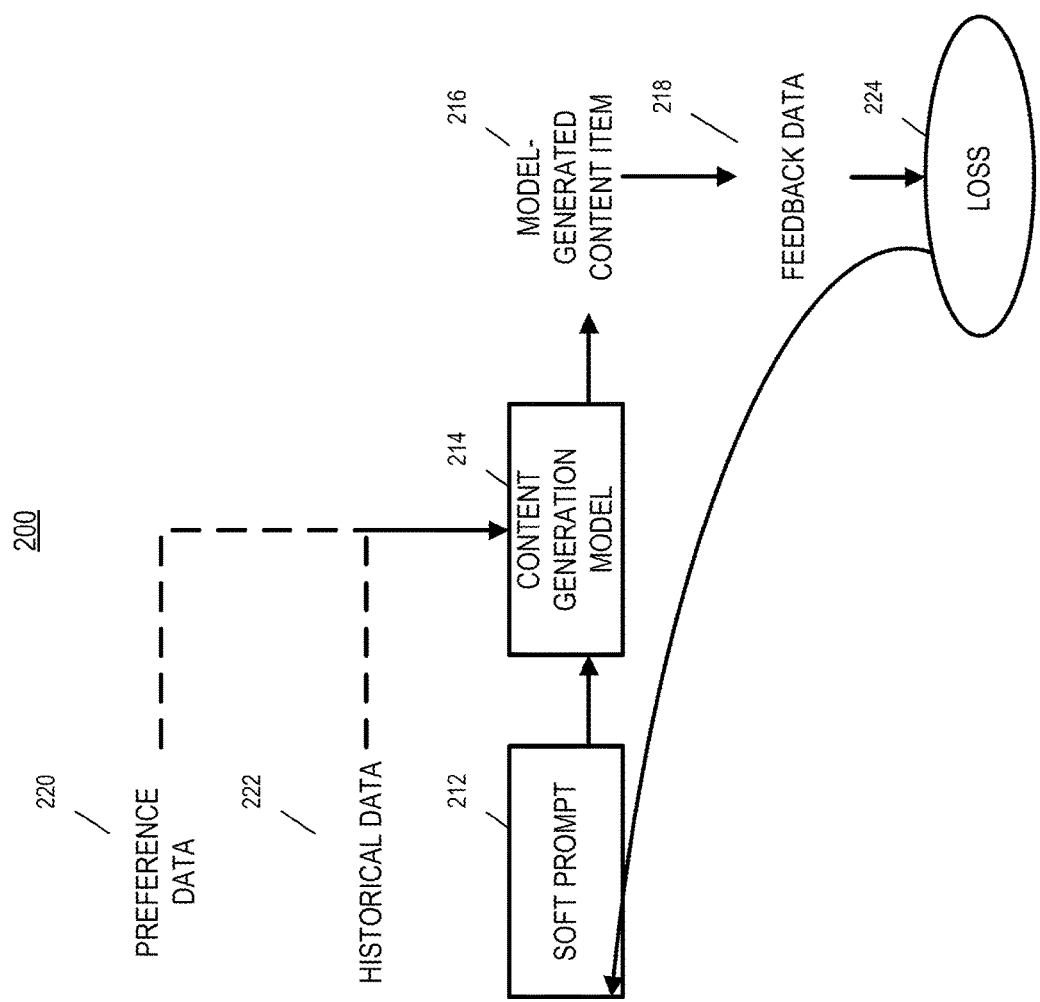
FIG. 2 depicts a block diagram of an example user-specific parameter tuning system according to example embodiments of the present disclosure.

FIG. 2 depicts a block diagram of an example user-specific parameter tuning system 200 according to example embodiments of the present disclosure. The user-specific parameter tuning system 200 is similar to parameter tuning system 10 of FIG. 1 except that user-specific parameter tuning system 200 further includes preference data 220 and/or historical data 222 processing.

In particular, in response to a user accessing a content generation interface, application, and/or platform, a soft prompt 212 can be obtained from a database. The soft prompt 212 can be obtained in response to retrieving input data descriptive of a particular user and/or other identifiers. In some implementations, a plurality of soft prompts 212 may be associated with the particular user. Different soft prompts may be obtained based on different contexts associated with the user, an environment, an application, and/or other contexts. The soft prompt 212 can include a set of parameters. The set of parameters of the soft prompt 212 can be generated and/or tuned to condition a generative model (e.g., a content generation model 214) to generate content items associated with learned tastes and/or interests of the user (and/or a set of users). The set of parameters can be tuned based on feedback data 218. The set of parameters can include weights adjusted based on feedback loops. The soft prompt 212 may be generated based on obtaining an initialization prompt based on one or more user preferences, inputs, and/or attributes. The initialization prompt can then be tuned based on a plurality of feedback loops that involve content items being generated and interacted with by the user (and/or a set of users).

The soft prompt 212 can be processed with a content generation model 214 to generate a model-generated content item 216. In some implementations, the content generation can include processing the soft prompt 212 and user data with the content generation model 214 to generate the model-generated content item 216. The user data can include user input data, preference data 220, historical data 222, user profile data, and/or other data. The user data can be processed to generate a prompt input that can further prompt the content generation model 214 on a topic, style, type, and/or other feature that is to be included in the model-generated content item 216. The user input data can include data descriptive of one or more inputs (e.g., a touch input, a gesture input, an audio input, an image input, and/or a multimodal input). The preference data 220 can be descriptive of manually input and/or learned preferences for the user and/or the set of users that may be stored in association with a user profile and/or a user device. The historical data 222 can be descriptive of a search history, a browsing history, a purchase history, an application history, a location history, an input history, and/or other data associated with historical interactions by and/or associated with the user. The user data may include contextual data associated with sensor data, global data, and/or other data.

The model-generated content item 216 can be provided for display to the user. Feedback data 218 can then be generated based on user interactions associated with the model-generated content item 216. The feedback data 218 can then be utilized to adjust one or more parameters of the soft prompt 212 based on a loss function 224 that evaluates the feedback data 218.

The tuning loop can be performed iteratively to fine tune the soft prompt 212 to learn content types, topics, styles, terminology, and/or other preferences of the user (or set of users). The soft prompt 212 may be stored in a profile database and may be indexed with a user profile for the particular user. In some implementations, a soft prompt 212 may be utilized for a plurality of users determined to be associated with one another. The association can be determined based on determining the users share similar tastes and interests in content. The determination may be based on search histories, browsing histories, purchase histories, social media data, manually entered preferences, and/or other data. Different content generation models and/or different candidate soft prompts may be utilized for different regions, different devices, different contexts, different user subgroups, and/or different applications.

The content generation model 214 can include one or more machine-learned models, one or more heuristic blocks, and/or one or more deterministic functions. The content generation model 214 may be a language model and/or another model that is trained on a plurality of different tasks that may be utilized by a plurality of different interfaces. For example, the content generation model may include a large language model that is utilized for text completion, text masking, vision language image captioning, summarization, document drafting, and/or other tasks. The content generation model 214 can include a generative model. The generative model can be trained to learn sequences and/or relationships between data features. The content generation model 214 can be trained to continually predict words and or phrases that have the highest probability of being next based on learned language representations, inputs, and/or context tokens until a content item is generated. The content generation model 214 may be trained on a plurality of different tasks utilizing training data associated with a plurality of different content types, styles, genres, terminology, and/or other attributes. The content generation model 214 may include a language model, an image generation model, an audio generation, a multimodal generation model, and/or other models. The content generation model 214 can include an autoregressive model and/or a diffusion model. The content generation model 214 may include one or more transformer models.

The model-generated content item 216 can include model-generated entertainment content. The model-generated content item 216 can include a poem, a short story, a play, a joke, a riddle, a comic, a painting, a video, a song, a podcast, a novel, a movie, a pilot episode of a television show, a picture book, and/or other content items. The model-generated content item 216 can include prediction data associated with a plurality of predictions performed by the content generation model 214 that may be descriptive of words, phrases, pixels, signals, and/or other forms of data predicted to be associated with one another and/or associated with the set of parameters of the soft prompt 212 and/or a prompt input. The predictions can be performed based on learned sequences, relationships, and/or representations. The model-generated content items 216 can differ from the content items of the training dataset of the content generation model 214 and/or the set of parameters. The model-generated content item 216 can include features associated with a plurality of different pre-existing content items (e.g., scenes, plot points, character attributes, genres, symbolism, structure, and/or other features). In some implementations, the model-generated content item 216 can be a new content item that differs from any known pre-existing content item.

The feedback data 218 can be descriptive of one or more user interactions associated with the model-generated content item 216. The feedback data 218 can be generated based on a viewing time, a save operation being performed, a download operation being performed, a copy operation being performed, a deletion operation being performed, a satisfaction level selection, a like option selection, and/or other interactions. In some implementations, a feedback interface can be provided with the model-generated content item 216 to receive inputs from the user that can be utilized to generate the feedback data 218. The feedback interface can include a satisfaction rating option, a satisfied option, a dissatisfied option, a text input box for an explanation, and/or augmentation options.

The feedback data 218 may be utilized to adjust one or more parameters of the soft prompt 212, which may include processing the feedback data 218 with a loss function 224 to generate a gradient descent that can be backpropagated to the soft prompt 212 to perform the tuning.

The parameters of the content generation model 214 may be fixed (or frozen) as the soft prompt 212 parameters are tuned. In some implementations, the content generation model 214 and the soft prompt 212 may be tuned in parallel and/or jointly. Alternatively and/or additionally, the set of parameters may be part of the content generation model 214.

Figure 3:
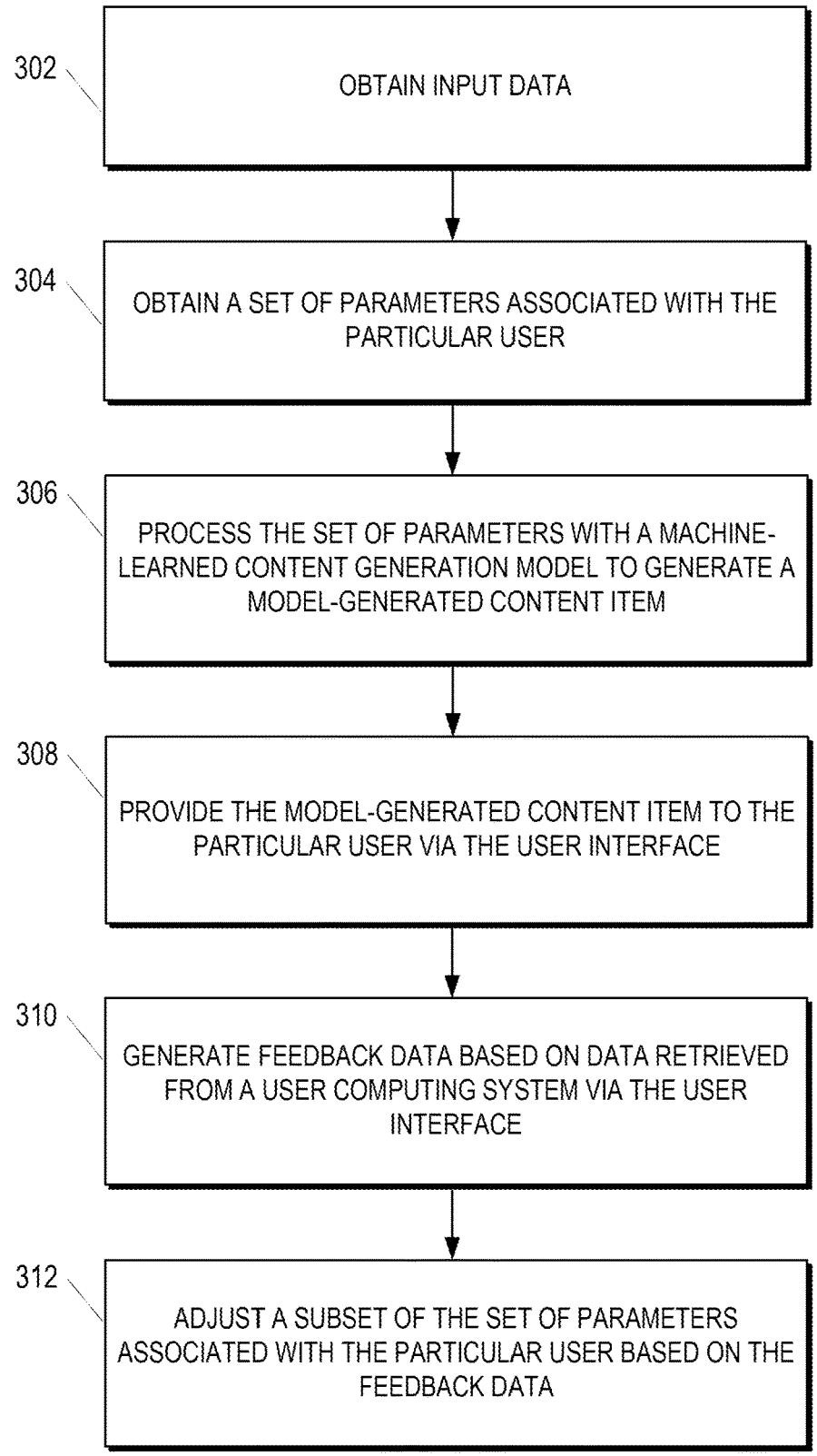
FIG. 3 depicts a flow chart diagram of an example method to perform content generation training according to example embodiments of the present disclosure.

FIG. 3 depicts a flow chart diagram of an example method to perform according to example embodiments of the present disclosure. Although FIG. 3 depicts steps performed in a particular order for purposes of illustration and discussion, the methods of the present disclosure are not limited to the particularly illustrated order or arrangement. The various steps of the method 300 can be omitted, rearranged, combined, and/or adapted in various ways without deviating from the scope of the present disclosure.

At 302, a computing system can obtain input data. The input data can be descriptive of a particular user accessing a user interface. The input data can be descriptive of the user computing device launching a particular application associated with the proactive content generation. The particular application may include a search application that includes an inspiration and entertainment tab. The inspiration and entertainment interface can be utilized to provide model-generated content items, suggested queries, and/or suggested web resources.

At 304, the computing system can obtain a set of parameters associated with the particular user. The set of parameters can be a tunable soft prompt. The set of parameters can be configured to condition a machine-learned model for a downstream task. For example, the set of parameters can be tuned to be processed with a generative model (e.g., a large language model, a text-to-image generation model, and/or other generative models) to perform a particular task.

At 306, the computing system can process the set of parameters with a machine-learned content generation model to generate a model-generated content item. The model-generated content item can be generated based on the set of parameters associated with the particular user. The machine-learned content generation model can include a generative model (e.g., an autoregressive language model, an image diffusion model, a vision language model, and/or other generative models). The machine-learned content generation model can include a transformer model. The model-generated content item can include fictional literature. The model-generated content item can include a story (e.g., a short story generated to emulate the style of a Victorian novel or a play in the Shakespearean style), a poem (e.g., a haiku), a joke (e.g., a multipart joke with a wordplay punchline), a riddle, a comic, an image (e.g., a generated art piece), a video, music, a podcast, a game, and/or other media content items. The model-generated content item may be generated to provide entertainment media to a particular user. The model-generated content item may be generated to include a style, topic, and/or length that may vary based on the set of parameters and/or a prompt input. The prompt input may be associated with a manual input by the user and/or an automatically generated prompt. The automatically generated prompt may be generated based on a user profile, which can include user preferences (manually entered and/or learned), search history data, browsing history data, application history data, purchase history data, and/or other user data.

In some implementations, the computing system can obtain search history data associated with the particular user. The search history data can be descriptive of a plurality of previous search queries associated with the particular user. In some implementations, the search history data can be descriptive of a plurality of search results selected by the particular user. The search history data can be descriptive of a query progression and/or repeat queries. The model-generated content item can be generated based on the search history data. For example, data associated with the search history data including topics, characters, style, aesthetic, and/or other attributes from queries, search results, knowledge panels, and/or model-generated responses can be implemented into the model-generated content item. The computing system can determine the search history data is associated with a particular topic (e.g., the search queries may be associated with socio-economic policies, soccer, mythical forests, college, and/or other topics). Data descriptive of the particular topic and the set of parameters can be processed with the machine-learned content generation model to generate the model-generated content item (e.g., model-generated content item can include a character, theme, setting, plot, and/or other attributes associated with the particular topic).

Additionally and/or alternatively, the computing system can obtain browsing history data associated with the particular user. The browsing history data can be descriptive of a plurality of web resources viewed previously by the particular user. The browsing history data can be descriptive of web resources visited, time viewed, time of visit, and how the web resource accessed (e.g., a bookmark selection, URL input, external link, and/or via a search result selection). The browsing history data may include data descriptive of web resource progression, repeat web resources, and/or single instance web resources. The model-generated content item can be generated based on the browsing history data. The computing system can determine the browsing history data is associated with a particular topic (e.g., based on processing the web resources with a semantic understanding model, a classification model, and/or another machine-learned model, based on embedding clusters, based on metadata, based on titles, and/or based on other determination techniques). Data descriptive of the particular topic and the set of parameters can be processed with the machine-learned content generation model to generate the model-generated content item (e.g., model-generated content item can include a character, theme, setting, plot, and/or other attributes associated with the particular topic). The computing system can determine the browsing history data is associated with a particular content type (e.g., a subset of the web resources may include poems of a particular structure, jokes of a particular genre, and/or short stories associated with young adult story themes). In some implementations, data descriptive of the particular content type and the set of parameters can be processed with the machine-learned content generation model to generate the model-generated content item. The model-generated content item can be the particular content type.

At 308, the computing system can provide the model-generated content item to the particular user via the user interface. The model-generated content item can be provided with one or more query suggestions, one or more suggested web resources, and/or one or more options to generate additional model-generated content items. The user interface can include an input box for inputting queries for searching and/or prompts for additional model-generated content item generation.

At 310, the computing system can generate feedback data based on data retrieved from a user computing system via the user interface. The feedback data can be associated with one or more interactions with the model-generated content item. The feedback data can be associated with a view time, whether a scroll input is received, a content item rating, gaze information, and/or other interactions. The feedback data may be generated based on inputs associated with feedback user interface elements.

In some implementations, the computing system can provide a feedback interface in the user interface with the model-generated content item. The feedback interface can include a user interface element for receiving feedback from the particular user. The computing system can obtain a feedback input from the user computing system via the feedback interface. The feedback input can be descriptive of a user satisfaction metric. In some implementations, the feedback data can be generated based on the feedback input.

Alternatively and/or additionally, the computing system can determine a viewing time associated with the model-generated content item being displayed via the user interface. The viewing time can be descriptive of a time of display of the model-generated content item until a navigation away from the model-generated content item display. The feedback data can be generated based on the viewing time.

At 312, the computing system can adjust a subset of the set of parameters associated with the particular user based on the feedback data. The computing system can store the set of parameters in a user profile database. The set of parameters can be a soft prompt that is indexed in association with the particular user. Each user may be associated with an individualized soft prompt. Alternatively and/or additionally, sets of users may share a soft prompt. For example, users with similar tastes and interests can be identified. The set of parameters may then be utilized for and/or tuned based on the set of users with similar tastes and interests.

Figure 4:
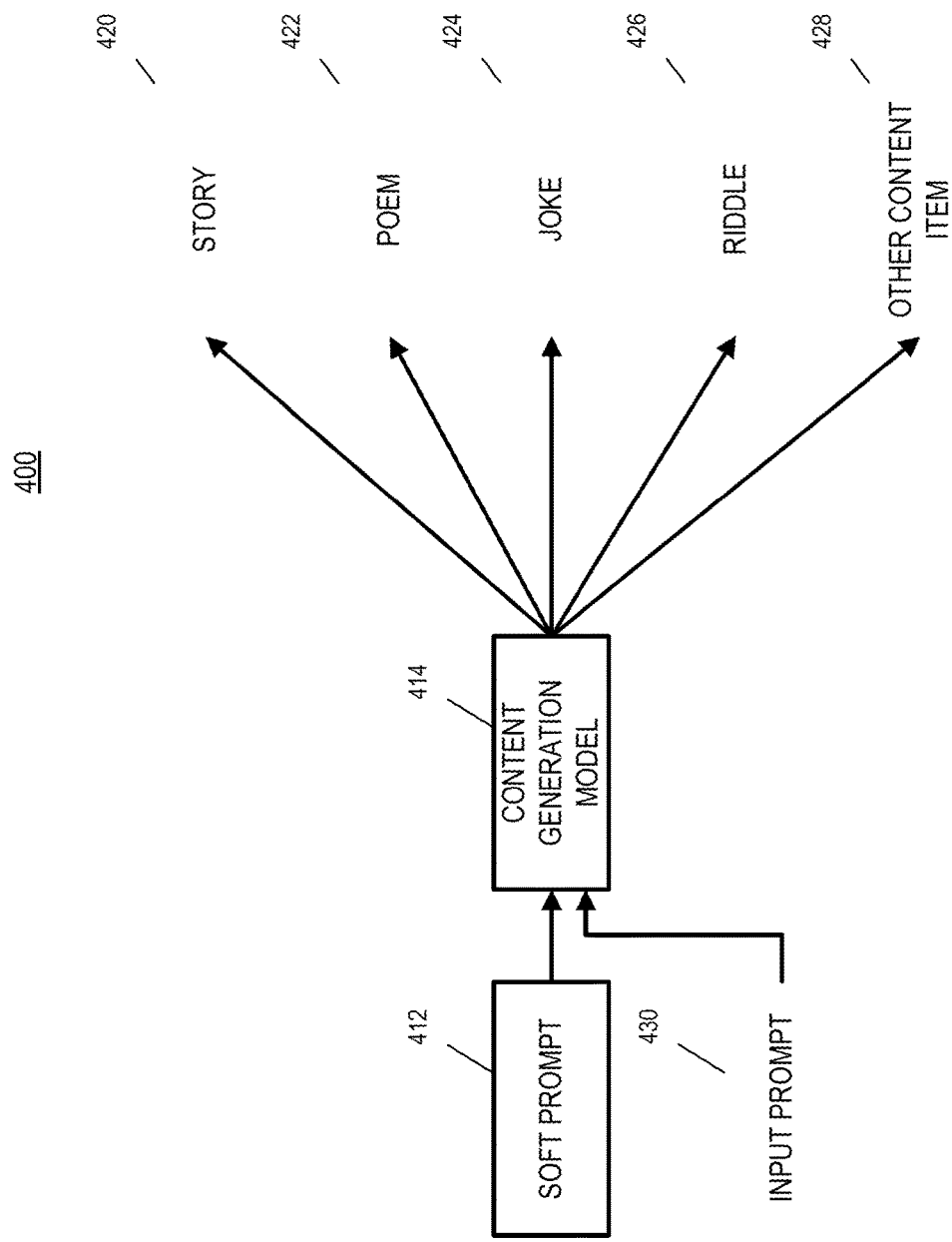
FIG. 4 depicts a block diagram of an example content generation system according to example embodiments of the present disclosure.

FIG. 4 depicts a block diagram of an example content generation system 400 according to example embodiments of the present disclosure. In particular, a soft prompt 412 can be obtained based on a particular user, context, and/or request. The soft prompt 412 can be processed with a machine-learned content generation model 414 to generate one or more model-generated content items (e.g., in some instances, a plurality of model-generated content items may be generated). In some implementations, the model-generated content item may be generated by processing the soft prompt 412 and an input prompt 430 with the machine-learned content generation model 414.

The soft prompt 412 can include a set of parameters tuned based on user tastes, interests, and/or preferences. The input prompt 430 may be user drafted and/or generated based on processing user data. The input prompt 430 can include text data, image data, audio data, and/or multimodal data. The input prompt 430 can be descriptive of a requested content type, style, topic, plot, setting (e.g., time and/or place), aesthetic, and/or other attributes. In some implementations, the input prompt 430 may include a few shot example of a style, topic, structure, genre, and/or content type. The input prompt 430 may include an example content item the user requests the content generation model 414 to model an output based on.

The machine-learned content generation model 414 can include one or more machine-learned models that may be pre-trained on one or more training datasets. The machine-learned content generation model 414 may be trained on a plurality of articles, books, poems, jokes, riddles, short stories, plays, comics, and/or other content items. In some implementations, training may include distillation learning, black box optimization, and/or other training techniques.

The model-generated content item can include a content item from one of a plurality of different content types, which may include a story 420, a poem 422, a joke 424, a riddle 426, and/or other content item 428. The model-generated content item may be associated with one or more of a plurality of different genres, one or more of a plurality of different topics, one or more of a plurality of different tropes, one or more of a plurality of different settings, one or more of a plurality of different character types, one or more of a plurality of different storylines, one or more of a plurality of different character progressions, one or more of a plurality of different plot lines, one or more of a plurality of different structures, one or more of a plurality of different styles, one or more of a plurality of different lexicons, and/or one or more of a plurality of different other attributes.

The model-generated story 420 can include a plurality of words structured to include a beginning, middle, and end associated with a plot. The story 420 can include one or more characters, one or more settings, one or more conversations, one or more climaxes, one or more lessons, and/or one or more literary features. The story 420 can be associated with a genre, which may be descriptive of a time period, a theme, pacing, and/or topic types. The soft prompt 412 may be tuned to condition the machine-learned content generation model 414 to generate one or more stories 420 that are associated with learned user preferences.

The model-generated poem 422 can include a plurality of words structured based on one or more styles and/or structures. The soft prompt 412 can be tuned based on learned preferences associated with poem types, structures, cadence, rhyme schemes, themes, and/or other attributes.

The model-generated joke 424 can include data structured to convey humor. The joke 424 may include puns, a punchline, allusions, and/or other features. The soft prompt 412 can be tuned based on learned humor styles, punchlines, wordplay, puns, structure, pacing, cadence, and/or other features.

The model-generated riddle 426 can include data structured as a puzzle. The riddle 426 may include codes, word relationships, and/or other features. The soft prompt 412 can be tuned based on learned puzzles, allusions, analogies, progressions, and/or other features.

Other model-generated content items 428 can include text data, image data, audio data, video data, statistical data, latent encoding data, and/or multimodal data. The content items can include entertainment data that includes fictional features generated based on predicted relationships and learned sequences of pre-existing entertainment-based media content items.

Figure 5:
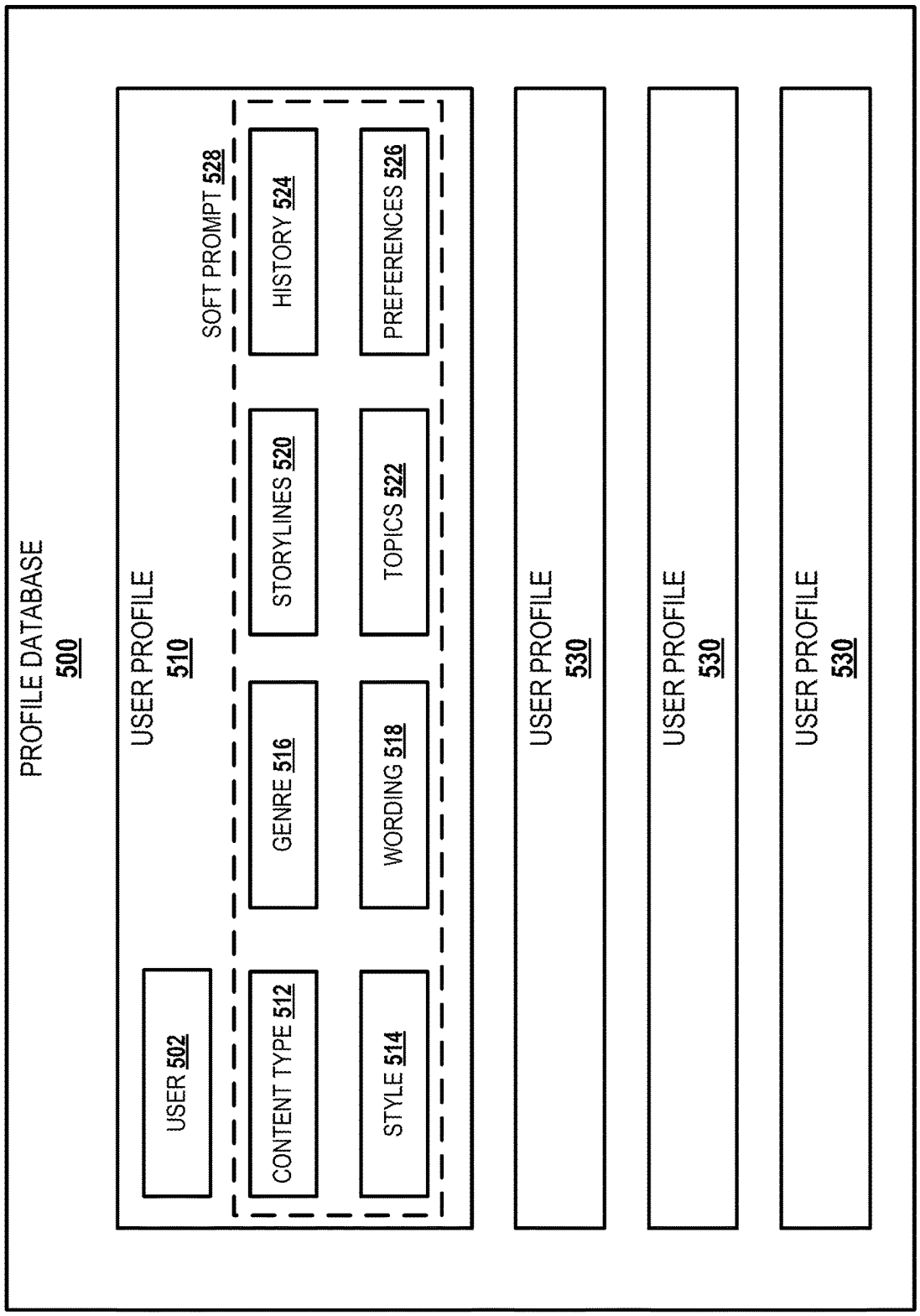
FIG. 5 depicts a block diagram of an example profile database according to example embodiments of the present disclosure.

FIG. 5 depicts a block diagram of an example profile database 500 according to example embodiments of the present disclosure. In particular, the soft prompt 528 may be obtained from a profile database 500 that stores data associated with a plurality of user profiles associated with a plurality of different users.

For example, the profile database 500 may be associated with a particular interface and/or a plurality of different interfaces, applications, and/or platforms. The profile database 500 may store a user profile 510 associated with a particular user and one or more other user profiles 530 associated with other users.

The user profile 510 can include user identification data 502 that can be utilized to identify and/or authenticate the particular user. The user identification data 502 can include names, hashes, profile usernames, profile passwords, shipping information, billing information, contact information, and/or other identifiers. Additionally and/or alternatively, the user profile 510 can store data associated with content types 512, content styles 514, content genres 516, content wording 518, content storylines 520, content topics 522, content history 524, and/or content preferences descriptive of content attributes the user has interacted with and indications of feedback associated with the interactions. The user profile 510 may store and/or index user preferences associated with different attributes for content items. The stored and/or indexed preferences may be utilized to train a soft prompt 528 that may be stored in the user profile 510 dataset. For example, subsets of the parameters of the soft prompt 528 may be associated with the different attributes. In some implementations, a first subset may be associated with content types 512 the user has conveyed interest, a second subset may be associated with content styles 514 the user has conveyed interest, a third subset may be associated with content genres 516 the user has conveyed interest, etc. The stored history 524 can include a search history, a browsing history, a purchase history, an application history, and/or other historical data that may be leveraged to initialize the content generation and/or tune the set of parameters of the soft prompt 528.

The other user profiles 530 may include stored user identification data, attribute data, preference data, history data, and/or soft prompts associated with other users that can be obtained in response to those users accessing the interface.

Figure 6:
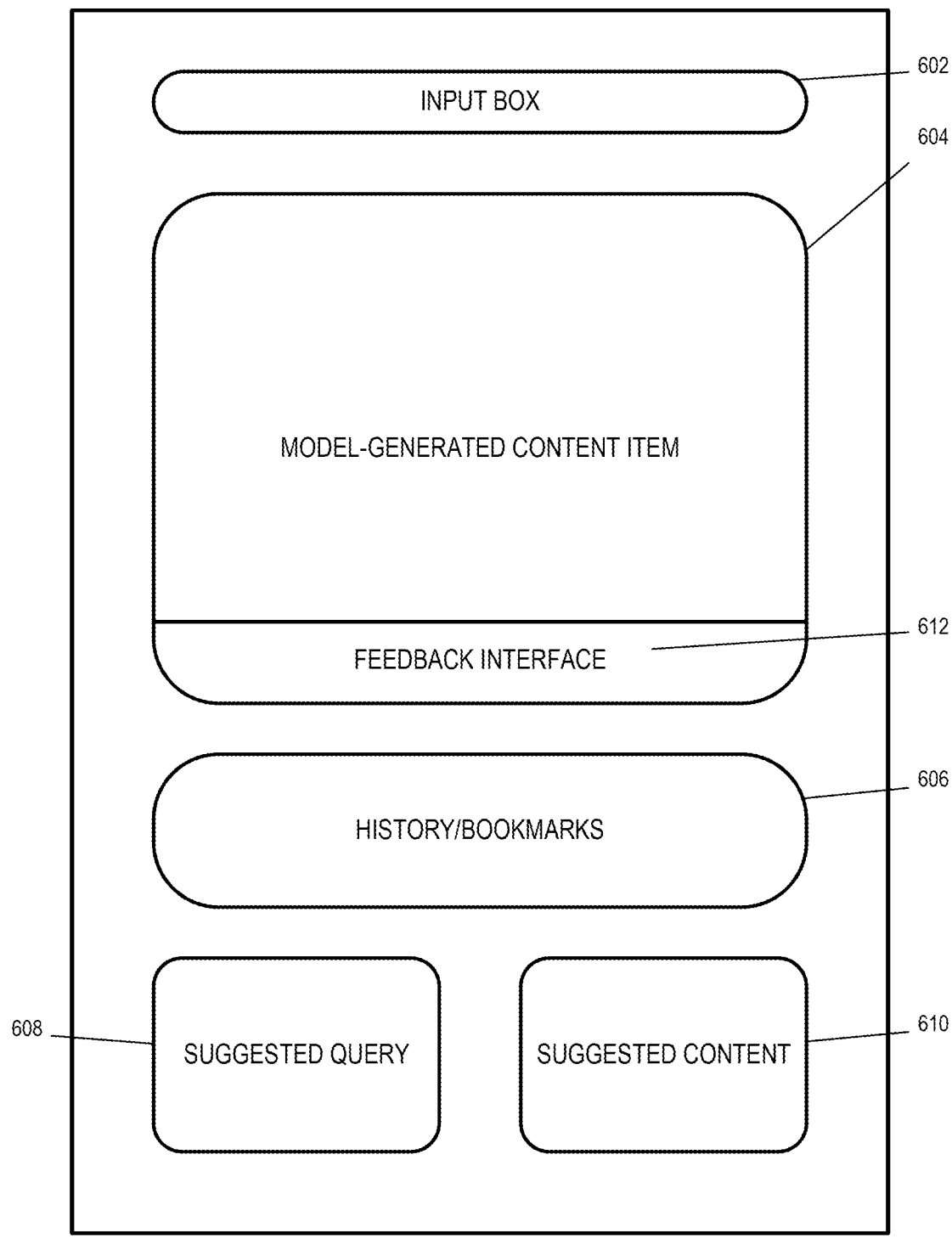
FIG. 6 depicts a block diagram of an example content display interface according to example embodiments of the present disclosure.

FIG. 6 depicts a block diagram of an example content display interface 600 according to example embodiments of the present disclosure. In particular, the content display interface 600 can include an input box 602, a model-generated content item viewing panel 604, a history/bookmarks panel 606, a suggested query panel 608, a suggested content panel 610, and/or a feedback interface 612.

The input box 602 can be configured to receive inputs from the user to perform search, generative model inferences, and/or other data processing. The model-generated content item viewing panel 604 can include a widget and/or panel for displaying one or more model-generated content items. The history/bookmarks panel 606 may display a web history, a search history, web bookmarks, query bookmarks, and/or other previously viewed content identifiers. The suggested query panel 608 can display suggested queries that may be based on query trends and may be generated with a machine-learned prediction model. The suggested content panel 610 can display suggested content that may be based on query trends and may be generated with a machine-learned summarization model. In some implementations, a feedback interface 612 can be included to receive inputs from the user to generate feedback data for the model-generated content items associated with user satisfaction.

Figure 7:
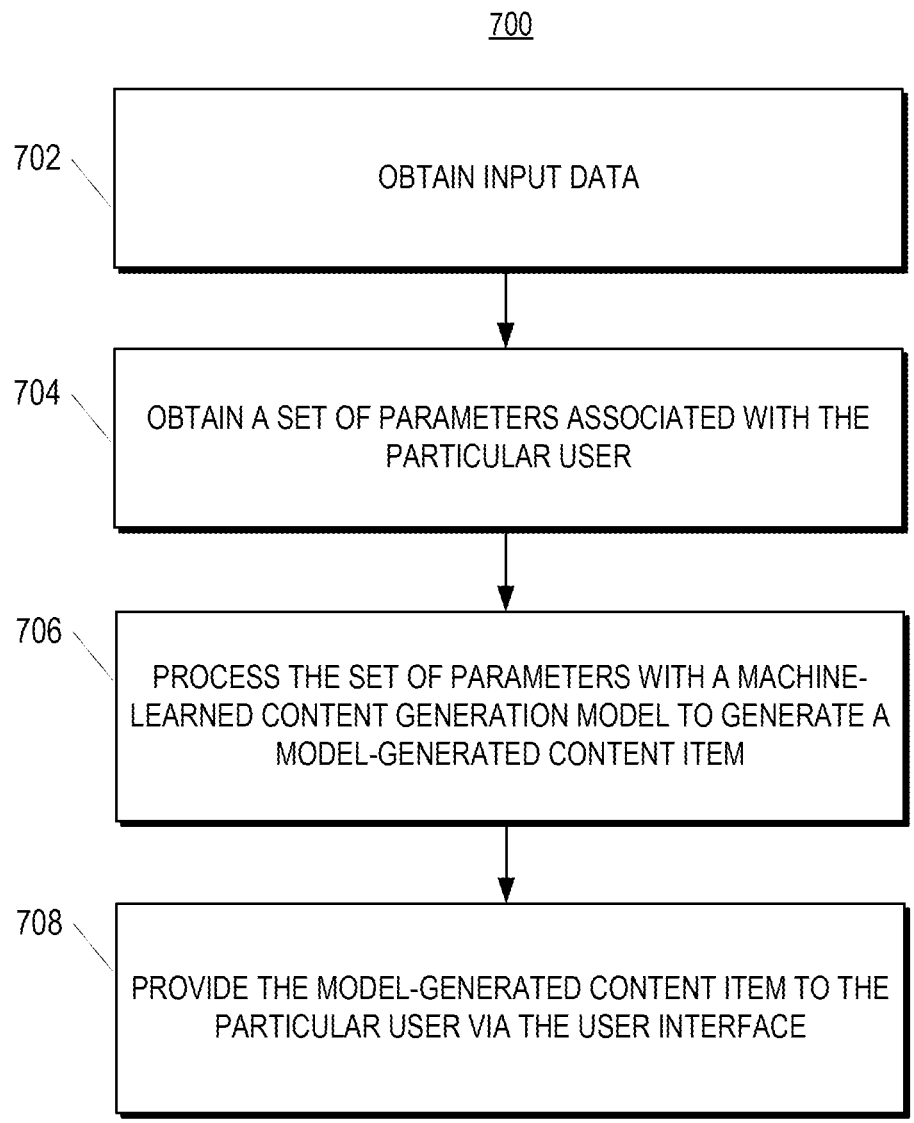
FIG. 7 depicts a flow chart diagram of an example method to perform user-specific content generation according to example embodiments of the present disclosure.

FIG. 7 depicts a flow chart diagram of an example method to perform according to example embodiments of the present disclosure. Although FIG. 7 depicts steps performed in a particular order for purposes of illustration and discussion, the methods of the present disclosure are not limited to the particularly illustrated order or arrangement. The various steps of the method 700 can be omitted, rearranged, combined, and/or adapted in various ways without deviating from the scope of the present disclosure.

At 702, a computing system can obtain input data. The input data can be descriptive of a particular user accessing a user interface. The input data can be generated and/or obtained in response to a particular application and/or web page being launched and/or opened. The input data can include a digital fingerprint associated with a user profile for the particular user. For example, the input data may include data descriptive of a user profile for the particular application, a set of applications, and/or a device identifier.

At 704, the computing system can obtain a set of parameters associated with the particular user. The set of parameters may have been trained based on interaction data associated with the particular user. The interaction data can be descriptive of previous interactions by the particular user with previously generated content items. The interactions can include inputs to a feedback interface indicating a level of satisfaction and/or suggested adjustments. In some implementations, the interactions can be associated with viewing time, saves, downloads, and/or other interactions.

At 706, the computing system can process the set of parameters with a machine-learned content generation model to generate a model-generated content item. The model-generated content item can be generated based on the set of parameters associated with the particular user. The particular content type can include a poem (e.g., a haiku, a limerick, freeform, etc.), a joke (e.g., a knock-knock joke, wordplay, etc.), prose, a riddle, a comic, a video, and/or audio. The model-generated content item can include a book preview that can be interacted with to generate a full model-generated book. The machine-learned content generation model may process an input with the set of parameters to generate the model-generated content item. The input may be obtained, received, and/or generated in response to receiving the input data. The input may include a manual input, a deterministic input associated with the user or a set of users, a global input, an automatically generated contextual input, and/or another type of input.

In some implementations, the computing system can obtain a prompt input. The prompt input can be descriptive of a request for a particular content type (e.g., "given my interest in X, can you generate a two line joke I might like"). The prompt input and the set of parameters can be processed with the machine-learned content generation model to generate the model-generated content item of the particular content type.

Alternatively and/or additionally, the prompt input can be descriptive of a request for a content item associated with a particular topic. The prompt input and the set of parameters can be processed with the machine-learned content generation model to generate the model-generated content item associated with the particular topic. The particular topic can be associated with a plot of a story, a setting, a style, and/or a character.

At 708, the computing system can provide the model-generated content item to the particular user via the user interface. The user interface may provide the model-generated content item in a particular panel that may be provided adjacent to one or more other panels. The model-generated content item can be provided with annotations of the content type, a topic, and/or one or more other classifications.

Figure 8:
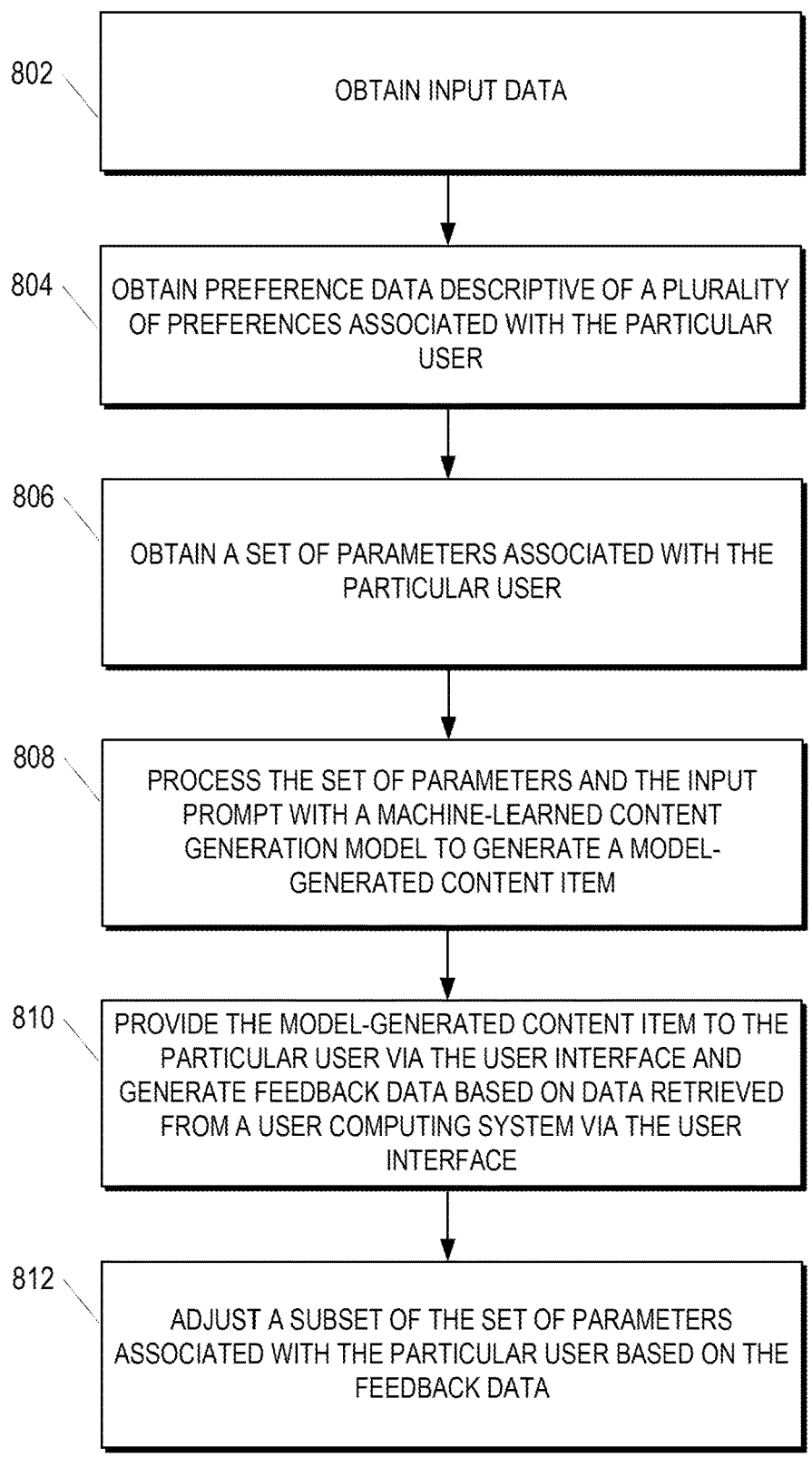
FIG. 8 depicts a flow chart diagram of an example method to perform soft prompt tuning according to example embodiments of the present disclosure.

FIG. 8 depicts a flow chart diagram of an example method to perform according to example embodiments of the present disclosure. Although FIG. 8 depicts steps performed in a particular order for purposes of illustration and discussion, the methods of the present disclosure are not limited to the particularly illustrated order or arrangement. The various steps of the method 800 can be omitted, rearranged, combined, and/or adapted in various ways without deviating from the scope of the present disclosure.

At 802, a computing system can obtain input data. The input data can be descriptive of a particular user accessing a user interface. The input data may include session data descriptive of a context for the interface being accessed. The session data can include a location, a browser, an application, a time, previously viewed content, time since last access, and/or other contexts. In some implementations, input data may be generated based on interactions and/or data associated with other interfaces and/or applications.

At 804, the computing system can obtain preference data descriptive of a plurality of preferences associated with the particular user. The computing system can process the preference data to generate a user-specific prompt. The preference data can be associated with manually input preferences, stored preferences, and/or learned preferences (e.g., learned by processing web data and/or search data).

At 806, the computing system can obtain a set of parameters associated with the particular user. The set of parameters can be a soft prompt associated with the particular user. The set of parameters may be locally stored on a user device and/or stored on a server computing system. The set of parameters may be stored in a profile database, may be stored on a blockchain system, and/or may be stored as application data cached on a user device.

At 808, the computing system can process the set of parameters and the input prompt with a machine-learned content generation model to generate a model-generated content item. The model-generated content item can be generated based on the set of parameters associated with the particular user. The user-specific prompt and the set of parameters can be processed with the machine-learned content generation model to generate the model-generated content item. The machine-learned content generation model can include a generative model trained to generate literary fiction. In some implementations, the machine-learned content generation model can include a language model trained on a plurality of different downstream tasks. The set of parameters can condition the machine-learned content generation model for a particular task. The input prompt can condition the generation for a topic, content type, and/or other content features. A different model-generated content item may be provided upon each instance of accessing the user interface. In some implementations, a plurality of model-generated content items.

At 810, the computing system can provide the model-generated content item to the particular user via the user interface and generate feedback data based on data retrieved from a user computing system via the user interface. The feedback interface may specifically request feedback on the entertainment, the humor, the immersion, etc. The feedback data can be associated with one or more interactions with the model-generated content item. The feedback data can be processed with a loss function to determine one or more adjustments to be made to the set of the parameters.

At 812, the computing system can adjust a subset of the set of parameters associated with the particular user based on the feedback data. The adjustment can occur while the parameters of the machine-learned content generation model stay fixed. In some implementations, the machine-learned content generation model can be leveraged for other tasks in addition to user-specific content generation. For example, the machine-learned content generation model may be utilized for masked language prediction, language completion, a chat bot, summarization, text-to-image generation, image captioning, and/or other tasks. The adjustment can fine tune the soft prompt and/or the model to generate a personalized system.

Tuning loops can begin very descriptive and guided (e.g., prompt inputs may be provided) then be relaxed as the set of parameters are tuned for personalization (e.g., proactive generation without prompt inputs can be performed once the set of parameters are tuned). The set of parameters may be part of the content generation model and/or may be separate conditioning parameters that are associated with prompting the content generation model for a particular task.

Figure 9A:
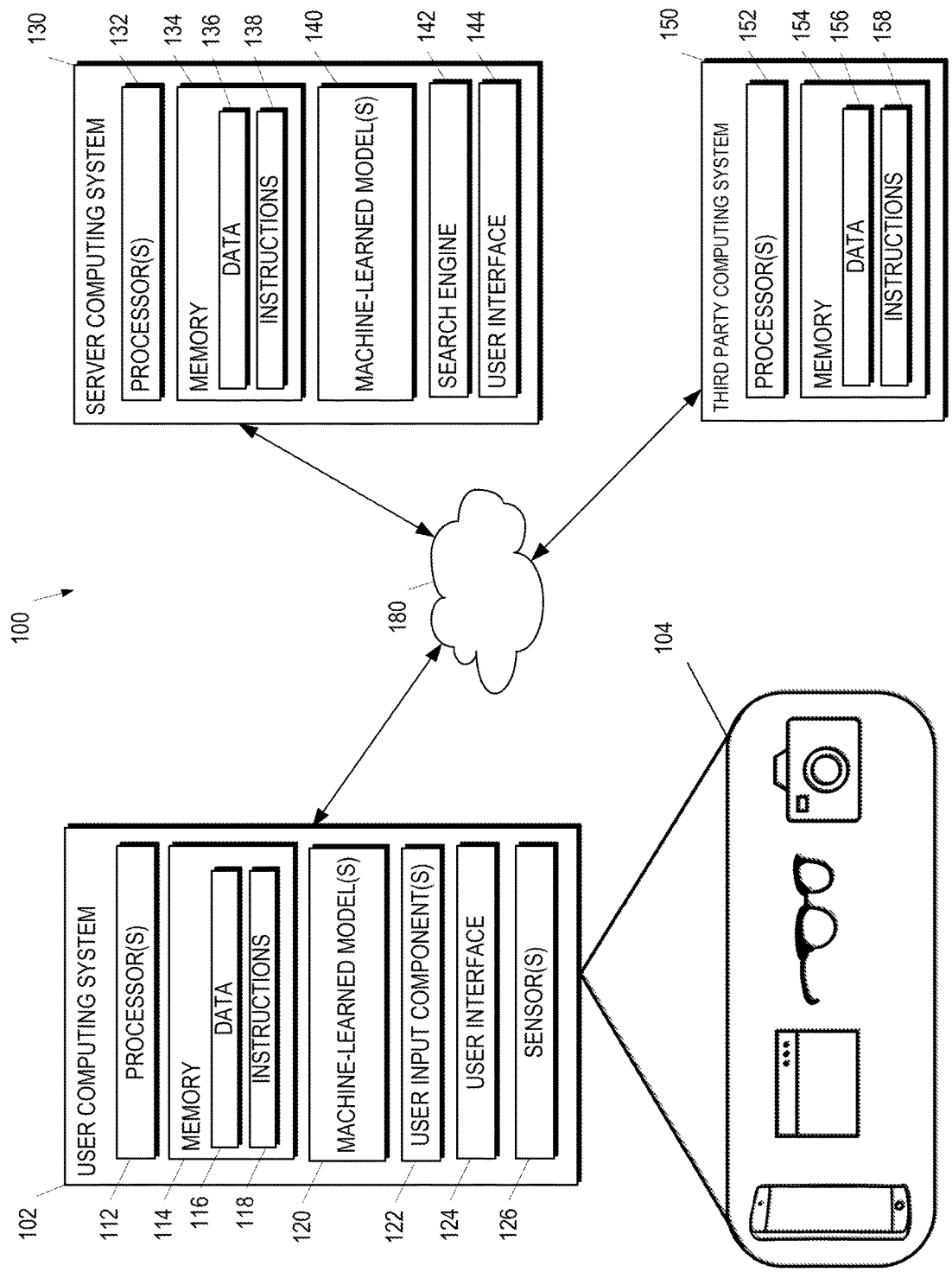
FIG. 9A depicts a block diagram of an example computing system that performs content generation according to example embodiments of the present disclosure.

FIG. 9A depicts a block diagram of an example computing system 100 that performs content generation according to example embodiments of the present disclosure. The system 100 includes a user computing system 102, a server computing system 130, and/or a third computing system 150 that are communicatively coupled over a network 180.

The user computing system 102 can include any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing system 102 includes one or more processors 112 and a memory 114. The one or more processors 112 can be any suitable processing device (e.g., a processor core, a microprocessor, an ASIC, a FPGA, a controller, a microcontroller, etc.) and can be one processor or a plurality of processors that are operatively connected. The memory 114 can include one or more non-transitory computer-readable storage mediums, such as RAM, ROM, EEPROM, EPROM, flash memory devices, magnetic disks, etc., and combinations thereof. The memory 114 can store data 116 and instructions 118 which are executed by the processor 112 to cause the user computing system 102 to perform operations.

In some implementations, the user computing system 102 can store or include one or more machine-learned models 120. For example, the machine-learned models 120 can be or can otherwise include various machine-learned models such as neural networks (e.g., deep neural networks) or other types of machine-learned models, including non-linear models and/or linear models. Neural networks can include feed-forward neural networks, recurrent neural networks (e.g., long short-term memory recurrent neural networks), convolutional neural networks or other forms of neural networks.

In some implementations, the one or more machine-learned models 120 can be received from the server computing system 130 over network 180, stored in the user computing device memory 114, and then used or otherwise implemented by the one or more processors 112. In some implementations, the user computing system 102 can implement multiple parallel instances of a single machine-learned model 120 (e.g., to perform parallel machine-learned model processing across multiple instances of input data and/or detected features).

More particularly, the one or more machine-learned models 120 may include one or more detection models, one or more classification models, one or more segmentation models, one or more augmentation models, one or more generative models, one or more natural language processing models, one or more optical character recognition models, and/or one or more other machine-learned models. The one or more machine-learned models 120 can include one or more transformer models. The one or more machine-learned models 120 may include one or more neural radiance field models, one or more diffusion models, and/or one or more autoregressive language models.

The one or more machine-learned models 120 may be utilized to detect one or more object features. The detected object features may be classified and/or embedded. The classification and/or the embedding may then be utilized to perform a search to determine one or more search results. Alternatively and/or additionally, the one or more detected features may be utilized to determine an indicator (e.g., a user interface element that indicates a detected feature) is to be provided to indicate a feature has been detected. The user may then select the indicator to cause a feature classification, embedding, and/or search to be performed. In some implementations, the classification, the embedding, and/or the searching can be performed before the indicator is selected.

In some implementations, the one or more machine-learned models 120 can process image data, text data, audio data, and/or latent encoding data to generate output data that can include image data, text data, audio data, and/or latent encoding data. The one or more machine-learned models 120 may perform optical character recognition, natural language processing, image classification, object classification, text classification, audio classification, context determination, action prediction, image correction, image augmentation, text augmentation, sentiment analysis, object detection, error detection, inpainting, video stabilization, audio correction, audio augmentation, and/or data segmentation (e.g., mask based segmentation).

Additionally or alternatively, one or more machine-learned models 140 can be included in or otherwise stored and implemented by the server computing system 130 that communicates with the user computing system 102 according to a client-server relationship. For example, the machine-learned models 140 can be implemented by the server computing system 130 as a portion of a web service (e.g., a viewfinder service, a visual search service, an image processing service, an ambient computing service, and/or an overlay application service). Thus, one or more models 120 can be stored and implemented at the user computing system 102 and/or one or more models 140 can be stored and implemented at the server computing system 130.

The user computing system 102 can also include one or more user input component 122 that receives user input. For example, the user input component 122 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input.

In some implementations, the user computing system can store and/or provide one or more user interfaces 124, which may be associated with one or more applications. The one or more user interfaces 124 can be configured to receive inputs and/or provide data for display (e.g., image data, text data, audio data, one or more user interface elements, an augmented-reality experience, a virtual reality experience, and/or other data for display. The user interfaces 124 may be associated with one or more other computing systems (e.g., server computing system 130 and/or third party computing system 150). The user interfaces 124 can include a viewfinder interface, a search interface, a generative model interface, a social media interface, and/or a media content gallery interface.

The user computing system 102 may include and/or receive data from one or more sensors 126. The one or more sensors 126 may be housed in a housing component that houses the one or more processors 112, the memory 114, and/or one or more hardware components, which may store, and/or cause to perform, one or more software packets. The one or more sensors 126 can include one or more image sensors (e.g., a camera), one or more lidar sensors, one or more audio sensors (e.g., a microphone), one or more inertial sensors (e.g., inertial measurement unit), one or more biological sensors (e.g., a heart rate sensor, a pulse sensor, a retinal sensor, and/or a fingerprint sensor), one or more infrared sensors, one or more location sensors (e.g., GPS), one or more touch sensors (e.g., a conductive touch sensor and/or a mechanical touch sensor), and/or one or more other sensors. The one or more sensors can be utilized to obtain data associated with a user's environment (e.g., an image of a user's environment, a recording of the environment, and/or the location of the user).

The user computing system 102 may include, and/or be part of, a user computing device 104. The user computing device 104 may include a mobile computing device (e.g., a smartphone or tablet), a desktop computer, a laptop computer, a smart wearable, and/or a smart appliance. Additionally and/or alternatively, the user computing system may obtain from, and/or generate data with, the one or more one or more user computing devices 104. For example, a camera of a smartphone may be utilized to capture image data descriptive of the environment, and/or an overlay application of the user computing device 104 can be utilized to track and/or process the data being provided to the user. Similarly, one or more sensors associated with a smart wearable may be utilized to obtain data about a user and/or about a user's environment (e.g., image data can be obtained with a camera housed in a user's smart glasses). Additionally and/or alternatively, the data may be obtained and uploaded from other user devices that may be specialized for data obtainment or generation.

The server computing system 130 includes one or more processors 132 and a memory 134. The one or more processors 132 can be any suitable processing device (e.g., a processor core, a microprocessor, an ASIC, a FPGA, a controller, a microcontroller, etc.) and can be one processor or a plurality of processors that are operatively connected. The memory 134 can include one or more non-transitory computer-readable storage mediums, such as RAM, ROM, EEPROM, EPROM, flash memory devices, magnetic disks, etc., and combinations thereof. The memory 134 can store data 136 and instructions 138 which are executed by the processor 132 to cause the server computing system 130 to perform operations.

In some implementations, the server computing system 130 includes or is otherwise implemented by one or more server computing devices. In instances in which the server computing system 130 includes plural server computing devices, such server computing devices can operate according to sequential computing architectures, parallel computing architectures, or some combination thereof.

As described above, the server computing system 130 can store or otherwise include one or more machine-learned models 140. For example, the models 140 can be or can otherwise include various machine-learned models. Example machine-learned models include neural networks or other multi-layer non-linear models. Example neural networks include feed forward neural networks, deep neural networks, recurrent neural networks, and convolutional neural networks. Example models 140 are discussed with reference to FIG. 9B.

Additionally and/or alternatively, the server computing system 130 can include and/or be communicatively connected with a search engine 142 that may be utilized to crawl one or more databases (and/or resources). The search engine 142 can process data from the user computing system 102, the server computing system 130, and/or the third party computing system 150 to determine one or more search results associated with the input data. The search engine 142 may perform term based search, label based search, Boolean based searches, image search, embedding based search (e.g., nearest neighbor search), multimodal search, and/or one or more other search techniques.

The server computing system 130 may store and/or provide one or more user interfaces 144 for obtaining input data and/or providing output data to one or more users. The one or more user interfaces 144 can include one or more user interface elements, which may include input fields, navigation tools, content chips, selectable tiles, widgets, data display carousels, dynamic animation, informational pop-ups, image augmentations, text-to-speech, speech-to-text, augmented-reality, virtual-reality, feedback loops, and/or other interface elements.

The user computing system 102 and/or the server computing system 130 can train the models 120 and/or 140 via interaction with the third party computing system 150 that is communicatively coupled over the network 180. The third party computing system 150 can be separate from the server computing system 130 or can be a portion of the server computing system 130. Alternatively and/or additionally, the third party computing system 150 may be associated with one or more web resources, one or more web platforms, one or more other users, and/or one or more contexts.

The third party computing system 150 can include one or more processors 152 and a memory 154. The one or more processors 152 can be any suitable processing device (e.g., a processor core, a microprocessor, an ASIC, a FPGA, a controller, a microcontroller, etc.) and can be one processor or a plurality of processors that are operatively connected. The memory 154 can include one or more non-transitory computer-readable storage mediums, such as RAM, ROM, EEPROM, EPROM, flash memory devices, magnetic disks, etc., and combinations thereof. The memory 154 can store data 156 and instructions 158 which are executed by the processor 152 to cause the third party computing system 150 to perform operations. In some implementations, the third party computing system 150 includes or is otherwise implemented by one or more server computing devices.

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP. SMTP, FTP), encodings or formats (e.g., HTML, XML), and/or protection schemes (e.g., VPN, secure HTTP, SSL).

The machine-learned models described in this specification may be used in a variety of tasks, applications, and/or use cases.

In some implementations, the input to the machine-learned model(s) of the present disclosure can be image data. The machine-learned model(s) can process the image data to generate an output. As an example, the machine-learned model(s) can process the image data to generate an image recognition output (e.g., a recognition of the image data, a latent embedding of the image data, an encoded representation of the image data, a hash of the image data, etc.). As another example, the machine-learned model(s) can process the image data to generate an image segmentation output. As another example, the machine-learned model(s) can process the image data to generate an image classification output. As another example, the machine-learned model(s) can process the image data to generate an image data modification output (e.g., an alteration of the image data, etc.). As another example, the machine-learned model(s) can process the image data to generate an encoded image data output (e.g., an encoded and/or compressed representation of the image data, etc.). As another example, the machine-learned model(s) can process the image data to generate an upscaled image data output. As another example, the machine-learned model(s) can process the image data to generate a prediction output.

In some implementations, the input to the machine-learned model(s) of the present disclosure can be text or natural language data. The machine-learned model(s) can process the text or natural language data to generate an output. As an example, the machine-learned model(s) can process the natural language data to generate a language encoding output. As another example, the machine-learned model(s) can process the text or natural language data to generate a latent text embedding output. As another example, the machine-learned model(s) can process the text or natural language data to generate a translation output. As another example, the machine-learned model(s) can process the text or natural language data to generate a classification output. As another example, the machine-learned model(s) can process the text or natural language data to generate a textual segmentation output. As another example, the machine-learned model(s) can process the text or natural language data to generate a semantic intent output. As another example, the machine-learned model(s) can process the text or natural language data to generate an upscaled text or natural language output (e.g., text or natural language data that is higher quality than the input text or natural language, etc.). As another example, the machine-learned model(s) can process the text or natural language data to generate a prediction output.

In some implementations, the input to the machine-learned model(s) of the present disclosure can be speech data. The machine-learned model(s) can process the speech data to generate an output. As an example, the machine-learned model(s) can process the speech data to generate a speech recognition output. As another example, the machine-learned model(s) can process the speech data to generate a speech translation output. As another example, the machine-learned model(s) can process the speech data to generate a latent embedding output. As another example, the machine-learned model(s) can process the speech data to generate an encoded speech output (e.g., an encoded and/or compressed representation of the speech data, etc.). As another example, the machine-learned model(s) can process the speech data to generate an upscaled speech output (e.g., speech data that is higher quality than the input speech data, etc.). As another example, the machine-learned model(s) can process the speech data to generate a textual representation output (e.g., a textual representation of the input speech data, etc.). As another example, the machine-learned model(s) can process the speech data to generate a prediction output.

In some implementations, the input to the machine-learned model(s) of the present disclosure can be sensor data. The machine-learned model(s) can process the sensor data to generate an output. As an example, the machine-learned model(s) can process the sensor data to generate a recognition output. As another example, the machine-learned model(s) can process the sensor data to generate a prediction output. As another example, the machine-learned model(s) can process the sensor data to generate a classification output. As another example, the machine-learned model(s) can process the sensor data to generate a segmentation output. As another example, the machine-learned model(s) can process the sensor data to generate a segmentation output. As another example, the machine-learned model(s) can process the sensor data to generate a visualization output. As another example, the machine-learned model(s) can process the sensor data to generate a diagnostic output. As another example, the machine-learned model(s) can process the sensor data to generate a detection output.

In some cases, the input includes visual data and the task is a computer vision task. In some cases, the input includes pixel data for one or more images and the task is an image processing task. For example, the image processing task can be image classification, where the output is a set of scores, each score corresponding to a different object class and representing the likelihood that the one or more images depict an object belonging to the object class. The image processing task may be object detection, where the image processing output identifies one or more regions in the one or more images and, for each region, a likelihood that region depicts an object of interest. As another example, the image processing task can be image segmentation, where the image processing output defines, for each pixel in the one or more images, a respective likelihood for each category in a predetermined set of categories. For example, the set of categories can be foreground and background. As another example, the set of categories can be object classes. As another example, the image processing task can be depth estimation, where the image processing output defines, for each pixel in the one or more images, a respective depth value. As another example, the image processing task can be motion estimation, where the network input includes multiple images, and the image processing output defines, for each pixel of one of the input images, a motion of the scene depicted at the pixel between the images in the network input.

The user computing system may include a number of applications (e.g., applications 1 through N). Each application may include its own respective machine learning library and machine-learned model(s). For example, each application can include a machine-learned model. Example applications include a text messaging application, an email application, a dictation application, a virtual keyboard application, a browser application, etc.

Each application can communicate with a number of other components of the computing device, such as, for example, one or more sensors, a context manager, a device state component, and/or additional components. In some implementations, each application can communicate with each device component using an API (e.g., a public API). In some implementations, the API used by each application is specific to that application.

The user computing system 102 can include a number of applications (e.g., applications 1 through N). Each application is in communication with a central intelligence layer. Example applications include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer can include a number of machine-learned models. For example a respective machine-learned model (e.g., a model) can be provided for each application and managed by the central intelligence layer. In other implementations, two or more applications can share a single machine-learned model. For example, in some implementations, the central intelligence layer can provide a single model (e.g., a single model) for all of the applications. In some implementations, the central intelligence layer is included within or otherwise implemented by an operating system of the computing system 100.

The central intelligence layer can communicate with a central device data layer. The central device data layer can be a centralized repository of data for the computing system 100. The central device data layer may communicate with a number of other components of the computing device, such as, for example, one or more sensors, a context manager, a device state component, and/or additional components. In some implementations, the central device data layer can communicate with each device component using an API (e.g., a private API).

Figure 9B:
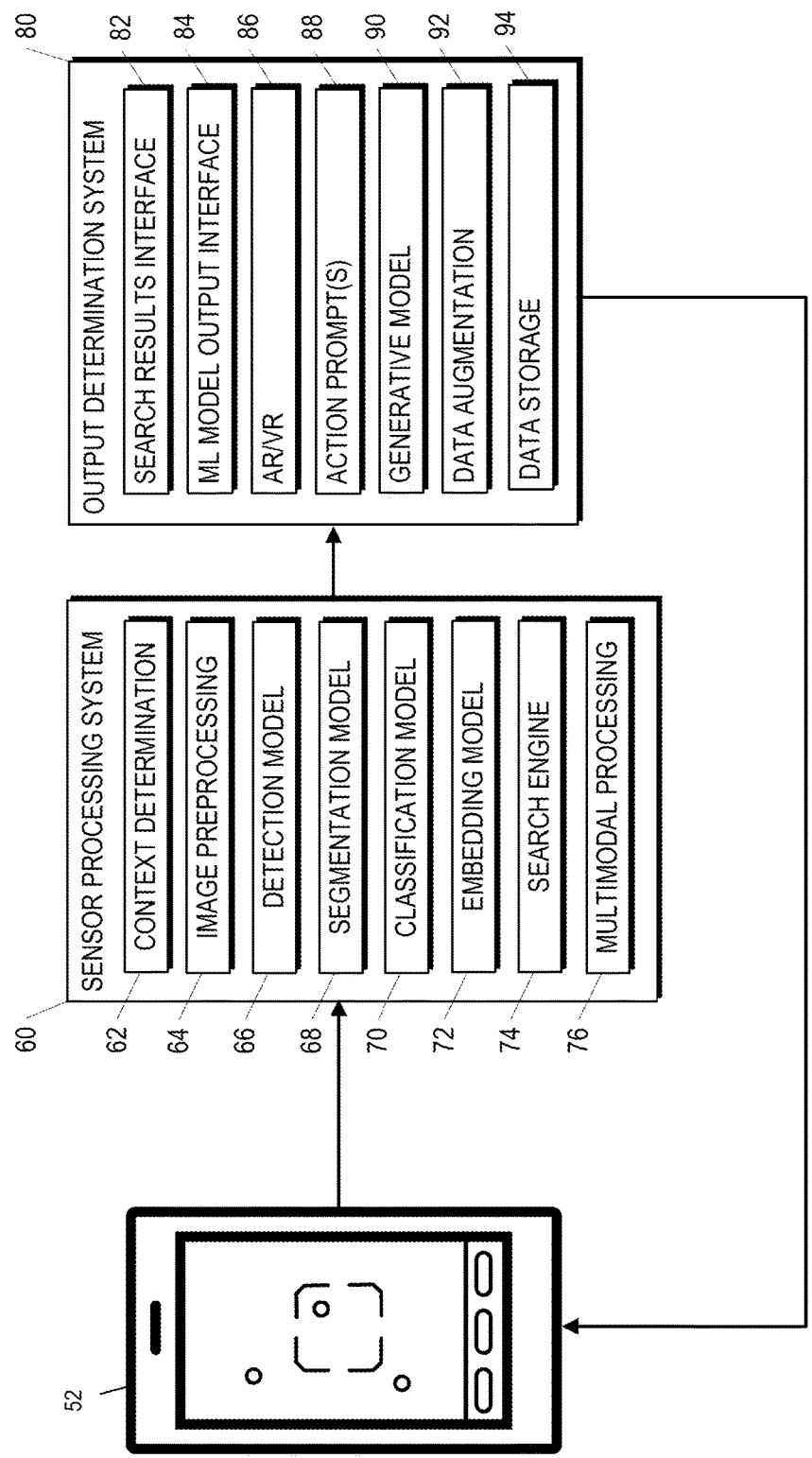
FIG. 9B depicts a block diagram of an example computing system that performs content generation according to example embodiments of the present disclosure.

FIG. 9B depicts a block diagram of an example computing system 50 that performs content generation according to example embodiments of the present disclosure. In particular, the example computing system 50 can include one or more computing devices 52 that can be utilized to obtain, and/or generate, one or more datasets that can be processed by a sensor processing system 60 and/or an output determination system 80 to feedback to a user that can provide information on features in the one or more obtained datasets. The one or more datasets can include image data, text data, audio data, multimodal data, latent encoding data, etc. The one or more datasets may be obtained via one or more sensors associated with the one or more computing devices 52 (e.g., one or more sensors in the computing device 52). Additionally and/or alternatively, the one or more datasets can be stored data and/or retrieved data (e.g., data retrieved from a web resource). For example, images, text, and/or other content items may be interacted with by a user. The interacted with content items can then be utilized to generate one or more determinations.

The one or more computing devices 52 can obtain, and/or generate, one or more datasets based on image capture, sensor tracking, data storage retrieval, content download (e.g., downloading an image or other content item via the internet from a web resource), and/or via one or more other techniques. The one or more datasets can be processed with a sensor processing system 60. The sensor processing system 60 may perform one or more processing techniques using one or more machine-learned models, one or more search engines, and/or one or more other processing techniques. The one or more processing techniques can be performed in any combination and/or individually. The one or more processing techniques can be performed in series and/or in parallel. In particular, the one or more datasets can be processed with a context determination block 62, which may determine a context associated with one or more content items. The context determination block 62 may identify and/or process metadata, user profile data (e.g., preferences, user search history, user browsing history, user purchase history, and/or user input data), previous interaction data, global trend data, location data, time data, and/or other data to determine a particular context associated with the user. The context can be associated with an event, a determined trend, a particular action, a particular type of data, a particular environment, and/or another context associated with the user and/or the retrieved or obtained data.

The sensor processing system 60 may include an image preprocessing block 64. The image preprocessing block 64 may be utilized to adjust one or more values of an obtained and/or received image to prepare the image to be processed by one or more machine-learned models and/or one or more search engines 74. The image preprocessing block 64 may resize the image, adjust saturation values, adjust resolution, strip and/or add metadata, and/or perform one or more other operations.

In some implementations, the sensor processing system 60 can include one or more machine-learned models, which may include a detection model 66, a segmentation model 68, a classification model 70, an embedding model 72, and/or one or more other machine-learned models. For example, the sensor processing system 60 may include one or more detection models 66 that can be utilized to detect particular features in the processed dataset. In particular, one or more images can be processed with the one or more detection models 66 to generate one or more bounding boxes associated with detected features in the one or more images.

Additionally and/or alternatively, one or more segmentation models 68 can be utilized to segment one or more portions of the dataset from the one or more datasets. For example, the one or more segmentation models 68 may utilize one or more segmentation masks (e.g., one or more segmentation masks manually generated and/or generated based on the one or more bounding boxes) to segment a portion of an image, a portion of an audio file, and/or a portion of text. The segmentation may include isolating one or more detected objects and/or removing one or more detected objects from an image.

The one or more classification models 70 can be utilized to process image data, text data, audio data, latent encoding data, multimodal data, and/or other data to generate one or more classifications. The one or more classification models 70 can include one or more image classification models, one or more object classification models, one or more text classification models, one or more audio classification models, and/or one or more other classification models. The one or more classification models 70 can process data to determine one or more classifications.

In some implementations, data may be processed with one or more embedding models 72 to generate one or more embeddings. For example, one or more images can be processed with the one or more embedding models 72 to generate one or more image embeddings in an embedding space. The one or more image embeddings may be associated with one or more image features of the one or more images. In some implementations, the one or more embedding models 72 may be configured to process multimodal data to generate multimodal embeddings. The one or more embeddings can be utilized for classification, search, and/or learning embedding space distributions.

The sensor processing system 60 may include one or more search engines 74 that can be utilized to perform one or more searches. The one or more search engines 74 may crawl one or more databases (e.g., one or more local databases, one or more global databases, one or more private databases, one or more public databases, one or more specialized databases, and/or one or more general databases) to determine one or more search results. The one or more search engines 74 may perform feature matching, text based search, embedding based search (e.g., k-nearest neighbor search), metadata based search, multimodal search, web resource search, image search, text search, and/or application search.

Additionally and/or alternatively, the sensor processing system 60 may include one or more multimodal processing blocks 76, which can be utilized to aid in the processing of multimodal data. The one or more multimodal processing blocks 76 may include generating a multimodal query and/or a multimodal embedding to be processed by one or more machine-learned models and/or one or more search engines 74.

The output(s) of the sensor processing system 60 can then be processed with an output determination system 80 to determine one or more outputs to provide to a user. The output determination system 80 may include heuristic based determinations, machine-learned model based determinations, user selection based determinations, and/or context based determinations.

The output determination system 80 may determine how and/or where to provide the one or more search results in a search results interface 82. Additionally and/or alternatively, the output determination system 80 may determine how and/or where to provide the one or more machine-learned model outputs in a machine-learned model output interface 84. In some implementations, the one or more search results and/or the one or more machine-learned model outputs may be provided for display via one or more user interface elements. The one or more user interface elements may be overlayed over displayed data. For example, one or more detection indicators may be overlayed over detected objects in a viewfinder. The one or more user interface elements may be selectable to perform one or more additional searches and/or one or more additional machine-learned model processes. In some implementations, the user interface elements may be provided as specialized user interface elements for specific applications and/or may be provided uniformly across different applications. The one or more user interface elements can include pop-up displays, interface overlays, interface tiles and/or chips, carousel interfaces, audio feedback, animations, interactive widgets, and/or other user interface elements.

Additionally and/or alternatively, data associated with the output(s) of the sensor processing system 60 may be utilized to generate and/or provide an augmented-reality experience and/or a virtual-reality experience 86. For example, the one or more obtained datasets may be processed to generate one or more augmented-reality rendering assets and/or one or more virtual-reality rendering assets, which can then be utilized to provide an augmented-reality experience and/or a virtual-reality experience 86 to a user. The augmented-reality experience may render information associated with an environment into the respective environment. Alternatively and/or additionally, objects related to the processed dataset(s) may be rendered into the user environment and/or a virtual environment. Rendering dataset generation may include training one or more neural radiance field models to learn a three-dimensional representation for one or more objects.

In some implementations, one or more action prompts 88 may be determined based on the output(s) of the sensor processing system 60. For example, a search prompt, a purchase prompt, a generate prompt, a reservation prompt, a call prompt, a redirect prompt, and/or one or more other prompts may be determined to be associated with the output(s) of the sensor processing system 60. The one or more action prompts 88 may then be provided to the user via one or more selectable user interface elements. In response to a selection of the one or more selectable user interface elements, a respective action of the respective action prompt may be performed (e.g., a search may be performed, a purchase application programming interface may be utilized, and/or another application may be opened).

In some implementations, the one or more datasets and/or the output(s) of the sensor processing system 60 may be processed with one or more generative models 90 to generate a model-generated content item that can then be provided to a user. The generation may be prompted based on a user selection and/or may be automatically performed (e.g., automatically performed based on one or more conditions, which may be associated with a threshold amount of search results not being identified).

The output determination system 80 may process the one or more datasets and/or the output(s) of the sensor processing system 60 with a data augmentation block 92 to generate augmented data. For example, one or more images can be processed with the data augmentation block 92 to generate one or more augmented images. The data augmentation can include data correction, data cropping, the removal of one or more features, the addition of one or more features, a resolution adjustment, a lighting adjustment, a saturation adjustment, and/or other augmentation.

In some implementations, the one or more datasets and/or the output(s) of the sensor processing system 60 may be stored based on a data storage block 94 determination.

The output(s) of the output determination system 80 can then be provided to a user via one or more output components of the user computing device 52. For example, one or more user interface elements associated with the one or more outputs can be provided for display via a visual display of the user computing device 52.

The processes may be performed iteratively and/or continuously. One or more user inputs to the provided user interface elements may condition and/or affect successive processing loops.

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computing system for soft prompt tuning for proactive content generation, the system comprising:
    one or more processors; and
    one or more non-transitory computer-readable media that collectively store instructions that, when executed by the one or more processors, cause the computing system to perform operations, the operations comprising:
        obtaining input data, wherein the input data is descriptive of a particular user accessing a user interface;
        obtaining, in response to obtaining the input data, a soft prompt associated with the particular user from a profile database, wherein the profile database stores a plurality of user-specific sets of parameters associated with a plurality of different users, wherein each user-specific set of parameters of the plurality of user-specific sets of parameters was tuned for user-specific content generation for a different respective user, wherein the soft prompt comprises a set of parameters, wherein the set of parameters comprise machine-learned weights;
        obtaining search history data associated with the particular user, wherein the search history data is descriptive of a plurality of previous search queries associated with the particular user;
        determining the search history data is associated with a particular topic;
        generating a prompt input based on the particular topic;
        processing the soft prompt and the prompt input with a machine-learned content generation model to generate a model-generated content item, wherein the model-generated content item is generated based on the set of parameters associated with the particular user, wherein the model-generated content item comprises model-generated fiction comprising one or more style attributes determined based on the soft prompt associated with the particular user, and wherein the machine-learned content generation model comprises a pre-trained generative model, wherein a model-generated content item style for the model-generated content item is determined based on the set of parameters of the soft prompt associated with the particular user, and wherein a topic of the model-generated content item is conditioned based on the prompt input;
        providing the model-generated content item to the particular user via the user interface;
        generating feedback data based on data retrieved from a user computing system via the user interface, wherein the feedback data is associated with one or more interactions with the model-generated content item; and
        adjusting a subset of the set of parameters of the soft prompt associated with the particular user based on the feedback data, wherein adjusting the subset of the set of parameters tunes at least a subset of the machine-learned weights of the soft prompt to adjust style attribute conditioning.

2. The system of claim 1, wherein the operations further comprise:
    obtaining browsing history data associated with the particular user, wherein the browsing history data is descriptive of a plurality of web resources viewed previously by the particular user; and
    wherein the model-generated content item is generated based on the browsing history data.

3. The system of claim 2, wherein the operations further comprise:
    determining the browsing history data is associated with the particular topic; and
    wherein data descriptive of the particular topic and the set of parameters are processed with the machine-learned content generation model to generate the model-generated content item.

4. The system of claim 2, wherein the operations further comprise:
    determining the browsing history data is associated with a particular content type; and
    wherein data descriptive of the particular content type and the set of parameters are processed with the machine-learned content generation model to generate the model-generated content item, wherein the model-generated content item is the particular content type.

5. The system of claim 1, wherein the operations further comprise:
providing a feedback interface in the user interface with the model-generated content item, wherein the feedback interface comprises a user interface element for receiving feedback from the particular user.

6. The system of claim 5, wherein the operations further comprise:
obtaining a feedback input from a user computing system via the feedback interface, wherein the feedback input is descriptive of a user satisfaction metric; and
wherein the feedback data is generated based on the feedback input.

7. The system of claim 1, wherein the operations further comprise:
determining a viewing time associated with the model-generated content item being displayed via the user interface; and
wherein the feedback data is generated based on the viewing time.

8. The system of claim 1, wherein a plurality of parameters of the machine-learned content generation model are fixed during adjusting of the subset of the set of parameters, and wherein the operations further comprise:
storing the soft prompt comprising the set of parameters in a user profile database.

9. A computer-implemented method for proactive content generation, the method comprising:
obtaining, by a computing system comprising one or more processors, input data, wherein the input data is descriptive of a particular user accessing a user interface;
obtaining, by the computing system and in response to obtaining the input data, a set of parameters associated with the particular user, wherein the set of parameters were trained based on interaction data associated with the particular user from a profile database that stores a plurality of user-specific sets of parameters associated with a plurality of different users, wherein each user-specific set of parameters of the plurality of user-specific sets of parameters was tuned for user-specific content generation for a different respective user, wherein the interaction data is descriptive of previous interactions by the particular user with previously generated content items, wherein the set of parameters comprise machine-learned weights, wherein the set of parameters including the machine-learned weights were fine-tuned to adjust style attribute conditioning based on user feedback associated with the particular user;
obtaining search history data associated with the particular user, wherein the search history data is descriptive of a plurality of previous search queries associated with the particular user;
determining the search history data is associated with a particular topic;
generating a prompt input based on the particular topic;
processing, by the computing system, the set of parameters and the prompt input with a machine-learned content generation model to generate a model-generated content item, wherein the model-generated content item is generated based on the set of parameters associated with the particular user, wherein the model-generated content item comprises model-generated fiction comprising one or more style attributes determined based on the set of parameters associated with the particular user, and wherein the machine-learned content generation model comprises a pre-trained generative model, wherein a model-generated content item style for the model-generated content item is determined based on the set of parameters associated with the particular user, and wherein a topic of the model-generated content item is conditioned based on the prompt input; and
providing, by the computing system, the model-generated content item to the particular user via the user interface.

10. The method of claim 9, further comprising:
obtaining, by the computing system, a manual prompt input, wherein the manual prompt input is descriptive of a request for a particular content type; and
wherein the manual prompt input, the prompt input, and the set of parameters are processed with the machine-learned content generation model to generate the model-generated content item of the particular content type.

11. The method of claim 9, wherein the particular content type comprises a poem.

12. The method of claim 9, wherein the particular content type comprises a joke.

13. The method of claim 9, wherein the particular topic is associated with a plot of a story.

14. One or more non-transitory computer-readable media that collectively store instructions that, when executed by one or more computing devices, cause the one or more computing devices to perform operations, the operations comprising:
obtaining input data, wherein the input data is descriptive of a particular user accessing a user interface;
obtaining, in response to obtaining the input data, a soft prompt associated with the particular user from a profile database, wherein the profile database stores a plurality of user-specific sets of parameters associated with a plurality of different users, wherein each user-specific set of parameters of the plurality of user-specific sets of parameters was tuned for user-specific content generation for a different respective user, wherein the soft prompt comprises a set of parameters, wherein the set of parameters comprise machine-learned weights;
obtaining search history data associated with the particular user, wherein the search history data is descriptive of a plurality of previous search queries associated with the particular user;
determining the search history data is associated with a particular topic;
generating a prompt input based on the particular topic;
processing the set of parameters of the soft prompt and the prompt input with a machine-learned content generation model to generate a model-generated content item, wherein the model-generated content item is generated based on the set of parameters associated with the particular user, wherein the model-generated content item comprises model-generated fiction comprising one or more style attributes determined based on the soft prompt associated with the particular user, and wherein the machine-learned content generation model comprises a pre-trained generative model, wherein a model-generated content item style for the model-generated content item is determined based on the set of parameters associated with the particular user, and wherein a topic of the model-generated content item is conditioned based on the prompt input;

providing the model-generated content item to the particular user via the user interface;

generating feedback data based on data retrieved from a user computing system via the user interface, wherein the feedback data is associated with one or more interactions with the model-generated content item; and adjusting a subset of the set of parameters of the soft prompt associated with the particular user based on the feedback data, wherein adjusting the subset of the set of parameters tunes at least a subset of the machine-learned weights of the soft prompt to adjust style attribute conditioning.

15. The one or more non-transitory computer-readable media of claim 14, wherein the machine-learned content generation model comprises a generative model trained to generate literary fiction.

16. The one or more non-transitory computer-readable media of claim 14, wherein the machine-learned content generation model comprises a language model trained on a plurality of different downstream tasks.

17. The one or more non-transitory computer-readable media of claim 16, wherein the operations further comprise:

obtaining preference data descriptive of a plurality of preferences associated with the particular user;

processing the preference data to generate a user-specific prompt; and wherein the user-specific prompt and the set of parameters are processed with the machine-learned content generation model to generate the model-generated content item.

* * * * *